(12) United States Patent
Wada et al.

(10) Patent No.: US 12,321,588 B2
(45) Date of Patent: Jun. 3, 2025

(54) DISPLAY DEVICE, DISPLAY SYSTEM, AND DISPLAY METHOD

(71) Applicant: SONY GROUP CORPORATION, Tokyo (JP)

(72) Inventors: Makoto Wada, Tokyo (JP); Eri Ueno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/681,156

(22) PCT Filed: Mar. 10, 2022

(86) PCT No.: PCT/JP2022/010576
§ 371 (c)(1),
(2) Date: Feb. 5, 2024

(87) PCT Pub. No.: WO2023/032287
PCT Pub. Date: Mar. 9, 2023

(65) Prior Publication Data
US 2024/0281137 A1    Aug. 22, 2024

(30) Foreign Application Priority Data

Sep. 2, 2021    (JP) .................. 2021-143467

(51) Int. Cl.
*G06F 3/0488* (2022.01)
*G09G 5/00* (2006.01)

(52) U.S. Cl.
CPC ............. *G06F 3/0488* (2013.01); *G09G 5/00* (2013.01)

(58) Field of Classification Search
CPC .. G06F 3/0488; G06F 3/04883; G06F 3/1454; G09G 5/00; G09G 2354/00; G09G 2356/00
See application file for complete search history.

(56) References Cited

U.S. PATENT DOCUMENTS 9,660,380 B1 * 5/2017 McCracken ....... H01R 13/6205
11,188,125 B2 * 11/2021 Miyashita ............. G06F 3/0426
(Continued)

FOREIGN PATENT DOCUMENTS

JP    2004-118477 A    4/2004
JP    2014-149699 A    8/2014
(Continued)

OTHER PUBLICATIONS

International Search Report and Written Opinion of PCT Application No. PCT/JP2022/010576, issued on May 24, 2022, 10 pages of ISRWO.

Primary Examiner — William Lu
(74) Attorney, Agent, or Firm — CHIP LAW GROUP

(57) ABSTRACT

Provided is a display device that includes a first display unit, a determination unit, a virtual display region setting unit, a transmission unit, and a reception unit. The determination unit determines a connection with a different display device that includes a second display unit. The virtual display region setting unit sets, based on a determination that a connection with the different display device has been made, a second virtual display region with which each position of the second display unit is associated, in association with a first virtual display region with which each position of the first display unit is associated. The transmission unit transmits information regarding a first contact position of a first contact on the first display unit to the different display device. The reception unit receives information regarding a second contact position of a second contact on the second display unit from the different display device.

19 Claims, 13 Drawing Sheets

(56) References Cited

U.S. PATENT DOCUMENTS

| | | | |
|---|---|---|---|
| 11,516,928 B2* | 11/2022 | Wang | H04R 1/028 |
| 2010/0066643 A1* | 3/2010 | King | G06F 3/1446 |
| | | | 345/1.3 |
| 2010/0085382 A1* | 4/2010 | Lundqvist | G06F 3/1438 |
| | | | 345/659 |
| 2010/0207844 A1* | 8/2010 | Manning | G06F 1/1618 |
| | | | 345/1.3 |
| 2011/0216064 A1* | 9/2011 | Dahl | H04M 1/0247 |
| | | | 345/428 |
| 2013/0290887 A1* | 10/2013 | Sun | G06F 3/0486 |
| | | | 715/764 |
| 2014/0232617 A1* | 8/2014 | Anite | G06F 3/1446 |
| | | | 345/1.3 |
| 2015/0294645 A1* | 10/2015 | Tagaya | G06F 3/04845 |
| | | | 345/173 |
| 2016/0180812 A1* | 6/2016 | Choi | G06F 3/1446 |
| | | | 345/204 |
| 2016/0283181 A1* | 9/2016 | Jung | G06F 3/04883 |
| 2017/0192733 A1* | 7/2017 | Huang | G06F 3/1446 |
| 2019/0008056 A1* | 1/2019 | Krell | F16B 2/12 |
| 2019/0121595 A1* | 4/2019 | Anderson | G06F 21/44 |
| 2019/0302980 A1* | 10/2019 | Derks | G06F 3/0486 |
| 2021/0041915 A1* | 2/2021 | Moser | G06F 1/1649 |
| 2021/0159307 A1* | 5/2021 | Kwon | H10K 59/18 |
| 2021/0397281 A1* | 12/2021 | Gupta | G02F 1/13336 |
| 2022/0147098 A1* | 5/2022 | Stewart | G06F 1/1677 |
| 2022/0391158 A1* | 12/2022 | Lemmens | G06F 3/1438 |
| 2023/0136873 A1* | 5/2023 | Wang | G06F 3/04897 |
| | | | 345/1.1 |

FOREIGN PATENT DOCUMENTS

| | | |
|---|---|---|
| JP | 2014-178659 A | 9/2014 |
| JP | 2015-079291 A | 4/2015 |
| JP | 2015-153016 A | 8/2015 |

* cited by examiner

DISPLAY DEVICE, DISPLAY SYSTEM, AND DISPLAY METHOD

CROSS REFERENCE TO RELATED APPLICATIONS

This application is a U.S. National Phase of International Patent Application No. PCT/JP2022/010576 filed on Mar. 10, 2022, which claims priority benefit of Japanese Patent Application No. JP 2021-143467 filed in the Japan Patent Office on Sep. 2, 2021. Each of the above-referenced applications is hereby incorporated herein by reference in its entirety.

TECHNICAL FIELD

The present technology relates to a display device that displays an image, a display system, and a display method.

BACKGROUND ART

Patent Literature 1 discloses an information processing apparatus that can be applied to an apparatus that handles electronic books. This information processing apparatus includes two screens, and text and images are displayed on one of the screens as content. When a user enlarges part of the displayed content, the enlarged content is displayed on the other screen. This allows the user to view desired content in the enlarged state on the other screen while viewing the content displayed in normal size on the one screen. Therefore, the use can enjoy the layout intended by the content creator on the one screen as well as check desired content on the other screen (paragraphs [0120] and [0129] of the specification, FIG. 21, and the like of Patent Literature 1).

CITATION LIST

Patent Literature

Patent Literature 1: Japanese Patent Application Laid-open No. 2004-118477

DISCLOSURE OF INVENTION

Technical Problem

There is a demand for a technology capable of improving user convenience in a display device capable of displaying an image.

In view of the circumstances as described above, it is an object of the present technology to provide a display device, a display system, and a display method that are capable of improving user convenience.

Solution to Problem

In order to achieve the above-mentioned object, a display device according to an embodiment of the present technology includes: a first display unit; a determination unit; a virtual display region setting unit; a transmission unit; and a reception unit.

The first display unit is capable of displaying an image.

The determination unit determines a connection with a different display device that includes a second display unit that is capable of displaying an image.

The virtual display region setting unit sets, in a case where it is determined that a connection with the different display device has been made, a second virtual display region with which each position of the second display unit is associated, in association with a first virtual display region with which each position of the first display unit is associated.

The transmission unit transmits information regarding a first contact position generated in accordance with a first contact on the first display unit to the different display device determined to be connected.

The reception unit receives information regarding a second contact position generated in accordance with a second contact on the second display unit from the different display device determined to be connected.

In this display device, in the case where it is determined that a connection with a different display device has been made, a first virtual display region corresponding to a first display unit of a display device and a second virtual display region corresponding to a second display unit of the different display device are set. In the case where the first display unit is touched, information regarding a first contact position is transmitted to the different display device. In the case where the second display unit is touched, information regarding the second contact position is received from the different display device. As a result, it is possible to improve user convenience.

The display device may further include an execution unit that executes processing corresponding to the first contact on the basis of a position on the first virtual display region corresponding to the first contact position, and executes processing corresponding to the second contact on the basis of a position on the second virtual display region corresponding to the received information regarding the second contact position.

The first display unit may execute, in a case where it is determined that a connection with the different display device has been made, a cooperation display mode for displaying the image in cooperation with the second display unit.

The display device may further include a proximity detection unit that detects proximity of an object. In this case, the determination unit may determine a connection with the different display device on the basis of proximity of the different display device.

The determination unit may determine whether or not the object whose proximity has been detected by the proximity detection unit is the different display device, and determine a connection with the different display device on a basis of a result of the determination.

The transmission unit may transmit first state information that is state information relating to the cooperation display mode of the display device to the different display device determined to be connected. In this case, the reception unit may receive second state information that is state information relating to the cooperation display mode of the different display device from the different display device determined to be connected.

The determination unit may determine, in a case where each of transmission of the first state information and reception of the second state information has been completed, that a connection with the different display device has been made.

The display device may further include a state setting unit that sets a state of the display device relating to the cooperation display mode such that the first state information and the second state information received by the reception unit match.

The state setting unit may set one of the display device and the different display device determined to be connected as a parent device and the other as a child device.

The state setting unit may set, in a case where the display device is set as a child device, the state of the display device relating to the cooperation display mode such that the first state information matches the second state information received from the different display device set as a parent device.

The state setting unit may set the state of the display device relating to the cooperation display mode to an initial state.

The determination unit may determine, in a case where it is determined that a connection with the different display device has been made, a difference between the first state information and the second state information received by the reception unit. In this case, the state setting unit may set, in a case where it is determined by the determination unit that there is the difference, the state of the display device relating to the cooperation display mode such that the first state information and the second state information received by the reception unit match.

The determination unit may determine the difference between the first state information and the second state information received by the reception unit, at a predetermined period.

The determination unit may determine the difference between the first state information and the second state information received by the reception unit, in accordance with a user's instruction.

The transmission unit may transmit, in a case where it is determined that a connection with the different display device has been made and a boundary between the first display unit and the second display unit has been touched, no information regarding the first contact position to the different display device.

Information regarding the first contact position may be generated at a first period in a case where it is determined by the determination unit that a connection with the different display device has not been made, and information regarding the first contact position may be generated at a second period longer than the first period in a case where it is determined that a connection with the different display device has been made.

The state setting unit may set, in a case where it is determined by the determination unit that a disconnection with the different display device has been newly made, the state of the display device relating to the cooperation display mode such that the first state information and the first state information immediately before being connected to the different display device match.

A display system according to an embodiment of the present technology includes: a first display device; and a second display device.

The first display device includes a first display unit, a first determination unit, a first virtual display region setting unit, a first transmission unit, and a first reception unit.

The second display device includes a second display unit, a second determination unit, a second virtual display region setting unit, a second transmission unit, and a second reception unit.

The first display unit is capable of displaying an image.

The first determination unit determines a connection with the second display device.

The first virtual display region setting unit sets, in a case where it is determined by the first determination unit that a connection with the second display device has been made, a second virtual display region with which each position of the second display unit is associated, in association with a first virtual display region with which each position of the first display unit is associated.

The first transmission unit transmits information regarding a first contact position generated in accordance with a first contact on the first display unit to the second display device determined to be connected by the first determination unit.

The first reception unit receives information regarding a second contact position generated in accordance with a second contact on the second display unit from the second display device determined to be connected by the first determination unit.

The second display unit is capable of displaying an image.

The second determination unit determines a connection with the first display device.

The second virtual display region setting unit sets, in a case where it is determined by the second determination unit that a connection with the first display device has been made, a fourth virtual display region with which each position of the first display unit is associated, in association with a third virtual display region with which each position of the second display unit is associated.

The second transmission unit transmits information regarding the second contact position to the first display device determined to be connected by the second determination unit.

The second reception unit receives information regarding the first contact position from the first display device determined to be connected by the second determination unit.

A display method according to an embodiment of the present technology includes: by a display device that includes a first display unit that is capable of displaying an image, determining a connection with a different display device that includes a second display unit that is capable of displaying an image.

In a case where a connection with the different display device has been made, a second virtual display region with which each position of the second display unit is associated is set in association with a first virtual display region with which each position of the first display unit is associated.

Information regarding a first contact position generated in accordance with a first contact on the first display unit is transmitted to the different display device determined to be connected.

Information regarding a second contact position generated in accordance with a second contact on the second display unit is received from the different display device determined to be connected.

A display method according to an embodiment of the present technology includes: by a first display device that includes a first display unit that is capable of displaying an image, determining a connection with a second display device that includes a second display unit that is capable of displaying an image.

In a case where a connection with the second display device has been made, a second virtual display region with which each position of the second display unit is associated is set in association with a first virtual display region with which each position of the first display unit is associated.

Information regarding a first contact position generated in accordance with a first contact on the first display unit is transmitted to the second display device determined to be connected.

Information regarding a second contact position generated in accordance with a second contact on the second display unit is received from the second display device determined to be connected.

By the second display device, a connection with the first display device is determined.

In a case where a connection with the first display device has been made, a fourth virtual display region with which each position of the first display unit is associated is set in association with a third virtual display region with which each position of the second display unit is associated.

Information regarding the second contact position is transmitted to the first display device determined to be connected.

Information regarding the first contact position is received from the first display device determined to be connected.

MODE (S) FOR CARRYING OUT THE INVENTION

Hereinafter, an embodiment according to the present technology will be described with reference to the drawings.
[Configuration of Display System]

Figure 1:
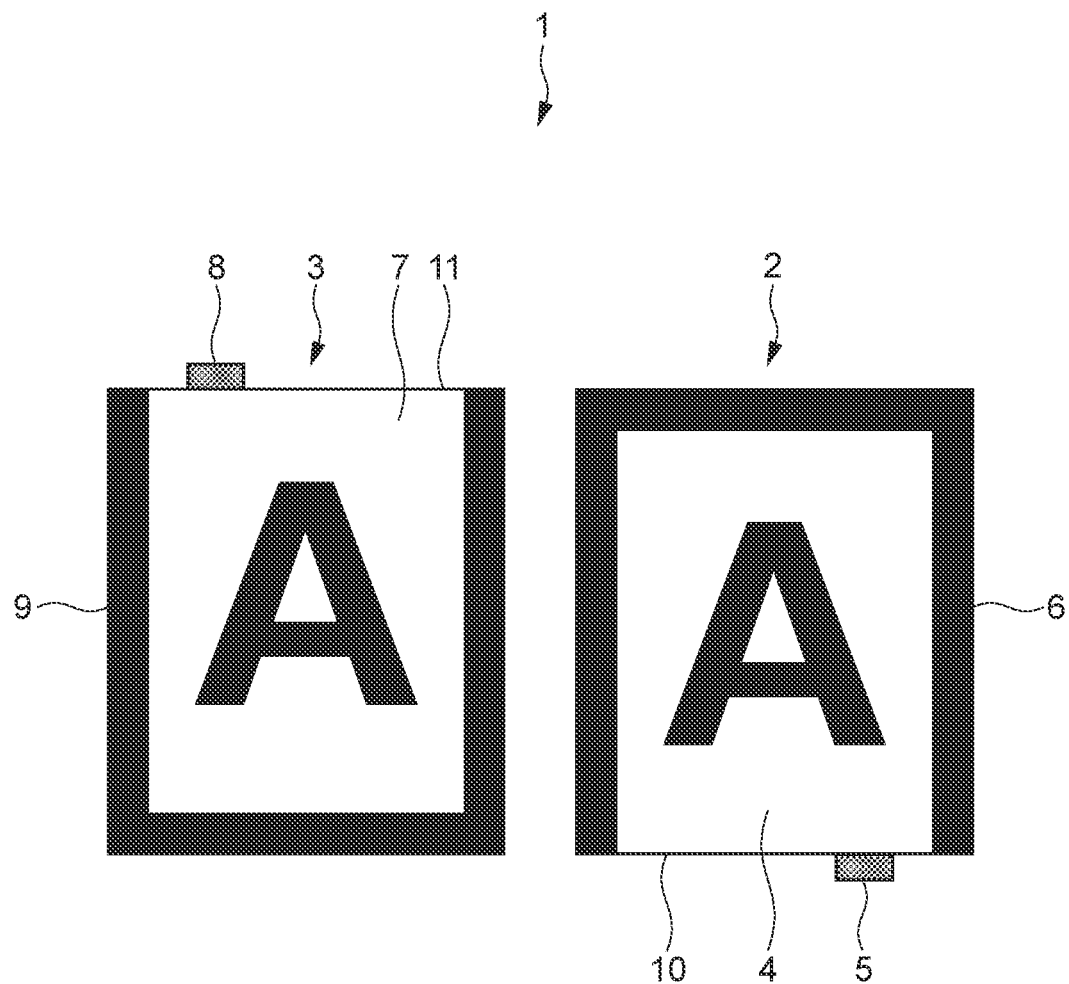
FIG. 1 is a schematic diagram for describing an overview of a display system.
Figure 2:
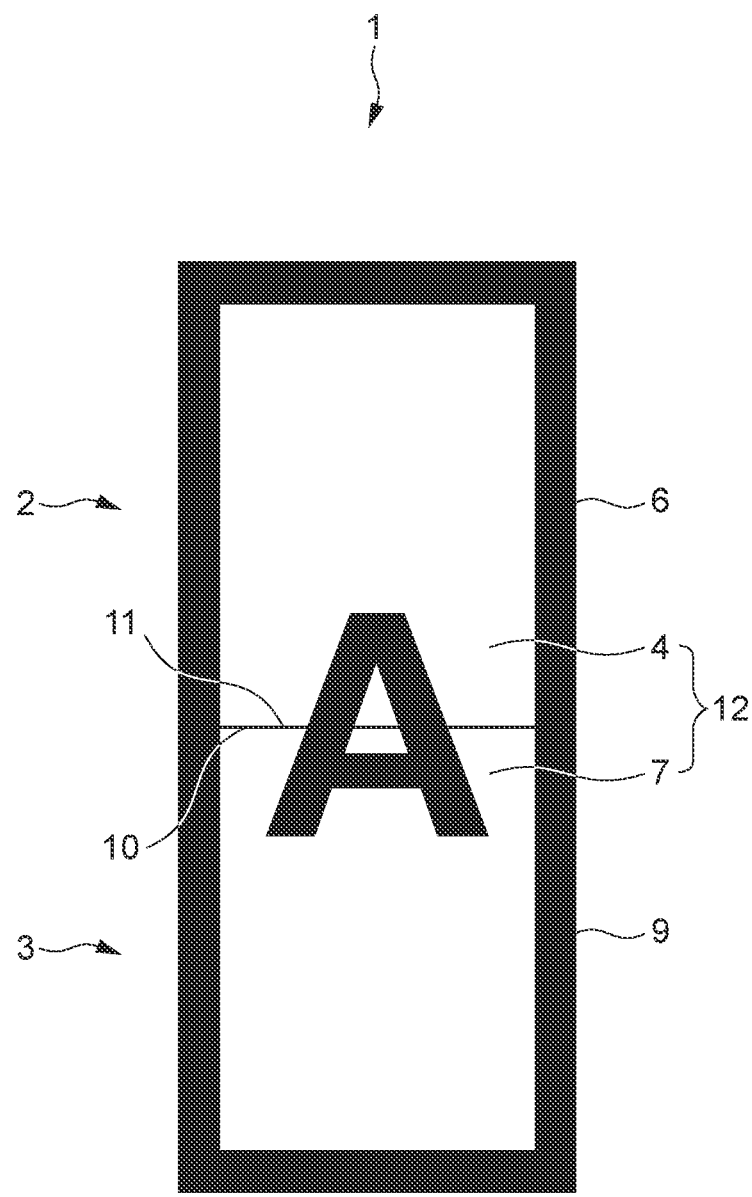
FIG. 2 is a schematic diagram for describing an overview of the display system.

FIG. 1 and FIG. 2 are each a schematic diagram for describing an overview of a display system.

In FIG. 1, a state in which a first display device and a second display device are separated is illustrated.

In FIG. 2, a state in which the first display device and the second display device are connected to each other is illustrated.

As shown in FIG. 1 and FIG. 2, a display system 1 includes a first display device 2, and a second display device 3.

The number of display devices constituting the display system 1 is not limited, and the display system 1 may include three or more display devices.

The first display device 2 and the second display device 3 can be realized by a device such as a smartphone and a tablet. It goes without saying that the present technology is not limited thereto, and an arbitrary computer device may be used.

As shown in FIG. 1, the first display device 2 includes a touch panel 4 and a proximity sensor 5.

In this embodiment, the touch panel 4 has a rectangular shape.

The touch panel 4 is capable of displaying an image. Although a character "A" is displayed on the touch panel 4 in the example shown in FIG. 1, a picture, an icon, an arbitrary GUI (Graphical User Interface), and the like can also be displayed.

Further, by touching the touch panel 4, a user can operate the first display device 2. The user can input an arbitrary operation such as a touch operation, a drag operation, and a click operation to the touch panel 4.

That is, the touch panel 4 is a device having functions of both a display unit and an operation unit.

The specific configuration of the touch panel 4 is not limited, and an arbitrary configuration may be adopted.

An outer frame 6 is disposed on part of the peripheral edge portion of the touch panel 4.

The outer frame 6 is disposed along three sides of the peripheral edge portion of the touch panel 4. In the example shown in FIG. 1, the outer frame 6 is disposed along the upper side, the right side, and the left side of the touch panel 4.

The specific configuration of the outer frame 6, such as a material, is not limited. Further, the outer frame 6 does not necessarily need to be disposed on the touch panel 4.

The proximity sensor 5 detects proximity of an object.

As the proximity sensor 5, an arbitrary device capable of detecting proximity of an object, such as a ranging sensor, may be used.

In this embodiment, the proximity sensor 5 is disposed on the lower side where the outer frame 6 of the touch panel 4 is not disposed (hereinafter, the lower side of the first display device 2 will be referred to as a first connection side 10).

The proximity sensor 5 corresponds to an embodiment of a proximity detection unit that detects proximity of an object according to the present technology.

The second display device 3 includes a touch panel 7 and a proximity sensor 8.

An outer frame 9 is disposed on the right side, the left side, and the lower side of the touch panel 7.

Further, the proximity sensor 8 is disposed on the upper side of the touch panel 7 (hereinafter, the upper side of the second display device 3 will be referred to as a second connection side 11).

The specific configuration of the touch panel 7 and the proximity sensor 8 is not limited, and an arbitrary configuration may be adopted.

The proximity sensor 8 corresponds to an embodiment of a proximity detection unit that detects proximity of an object according to the present technology.

In this embodiment, the configurations of the first display device 2 and the second display device 3 excluding the positions where the outer frames 6 and 9 and the proximity sensors 5 and 8 are disposed are equal to each other. It goes without saying that the application of the present technology is not limited to the case where such two display devices are used.

As shown in FIG. 2, the first display device 2 and the second display device 3 can be connected to each other.

Specifically, the first display device 2 and the second display device 3 are connected to each other such that the first connection side 10 that is the lower side of the first display device 2 and the second connection side 11 that is the upper side of the second display device 3 abut on each other.

After the connection, all peripheral edge portions of a touch panel including the touch panels 4 and 7 (hereinafter, referred to as an integrated touch panel 12) are surrounded by the outer frames 6 and 9.

The configuration, method, and the like for connecting the first display device 2 and the second display device 3 to each other are not limited, and the connection may be realized by an arbitrary configuration and method.

In this embodiment, in the case where the first display device 2 and the second display device 3 are connected to each other, the touch panels 4 and 7 are capable of cooperating to display an image. That is, the integrated touch panel 12 is capable of displaying an image on a large screen.

In the example shown in FIG. 2, the upper half of the character "A" is displayed on the touch panel 4 and the lower half is displayed on the touch panel 7.

In this way, in the case where the first display device 2 and the second display device 3 are connected to each other, the touch panels 4 and 7 are capable of operating as one screen and displaying one image. Meanwhile, as shown in FIG. 1, during a separation, the touch panels 4 and 7 are each capable of operating as a separate screen and individually displaying an image. As a result, for example, it is possible to switch the UI (User Interface) and the like when the two devices are connected and separated.

The content of specific display control by the touch panels 4 and 7 when the first display device 2 and the second display device 3 are connected and separated will be described below.

Figure 3:
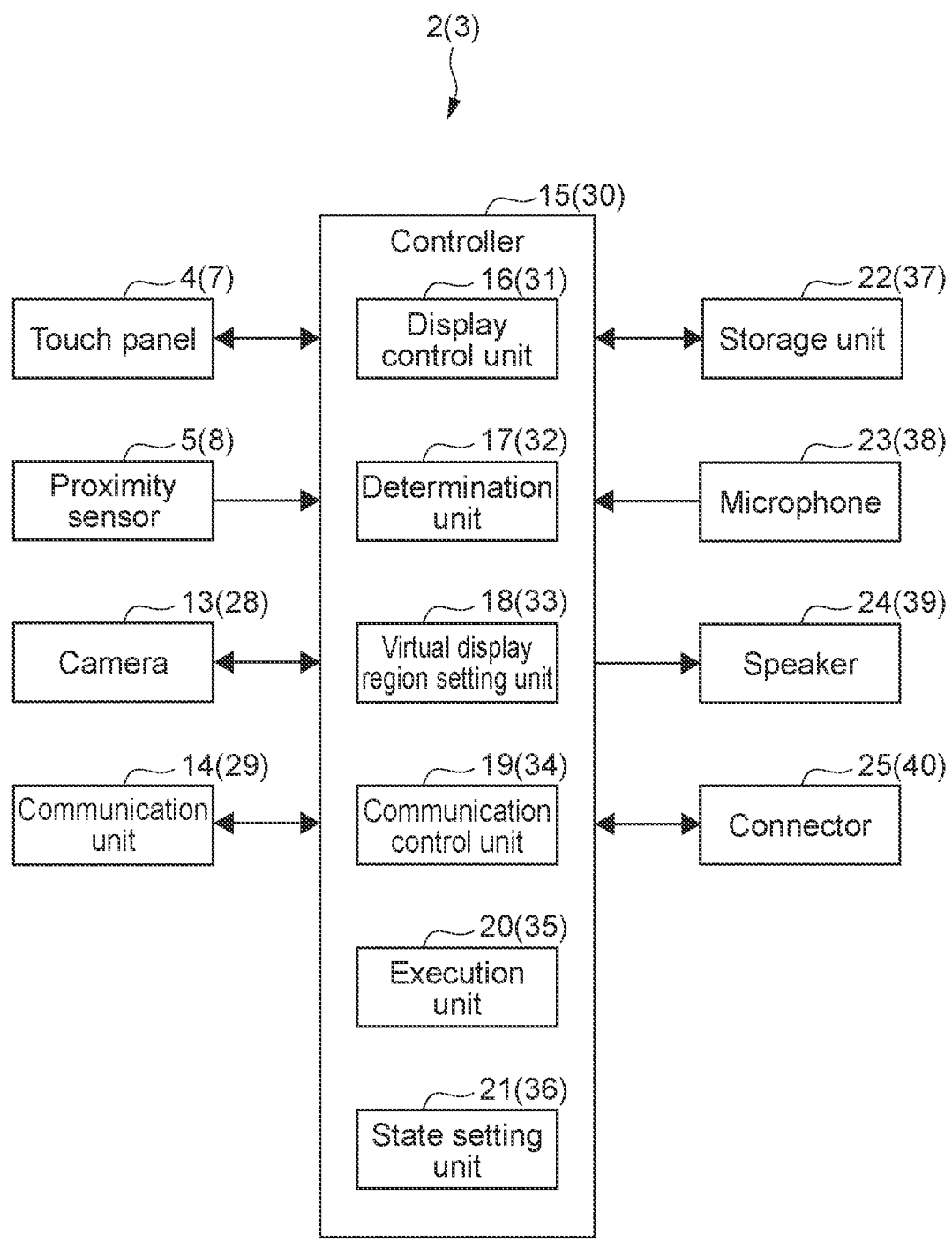
FIG. 3 is a block diagram showing a functional configuration example of a first display device and a second display device.

FIG. 3 is a block diagram showing a functional configuration example of the first display device 2 and the second display device 3.

In this embodiment, the specific configurations of the first display device 2 and the second display device 3 are equal to each other. Therefore, a specific configuration example of the first display device 2 and the second display device 3 will be described with reference to the same FIG. 3. The reference symbols in parentheses in FIG. 3 re reference symbols of the blocks of the second display device 3.

It goes without saying that the application of the present technology is not limited to the case where such two display devices are used.

As shown in FIG. 3, the first display device 2 further includes a camera 13, a communication unit 14, a controller 15, a storage unit 22, a microphone 23, a speaker 24, and a connector 25.

The camera 13 images an object around the first display device 2, or the like. As the camera 13, a digital camera such as a CCD (Charge Coupled Device) camera is used. In addition, an arbitrary imaging device may be used.

The communication unit 14 is a module for executing network communication, short-range wireless communication, or the like with another device. For example, a wireless LAN module such as Wi-Fi, and a communication module such as Bluetooth (registered trademark) are provided.

In this embodiment, communication with the second display device 3 is realized via the communication unit 14.

The microphone 23 detects sound information around the first display device 2. For example, a voice from speech of the user is detected as appropriate. As a result, for example, the user can make a phone call using the first display device 2 and perform operation input using voice input.

The speaker 24 outputs audio. For example, the speaker 24 provides audio notification to the user.

The configuration of the speaker 24 is not limited. For example, the speaker 24 capable of outputting stereo sound, monaural sound, and the like may be used as appropriate.

The connector 25 is a terminal for connection to another device. For example, a terminal such as a universal serial bus (USB) and a high-definition multimedia interface (HDMI) (registered trademark) is provided. Further, during charging, a charging terminal of the charging dog (cradle) and the connector 25 are connected to each other to perform charging.

The controller 15 controls the operation of each block of the first display device 2.

The controller 15 includes hardware necessary for configuring a computer, such as a CPU, a ROM, a RAM, and an HDD (Hard Disk Drive). For example, the CPU loads the program according to the present technology stored in the ROM or the like in advance into the RAM and executes the program, thereby executing processing relating to the display method according to the present technology.

As the controller 15, a PLD such as an FPGA and other devices such as an ASIC may be used. Further, an arbitrary computer such as a PC (Personal Computer) may function as the controller 15.

The program is installed on the first display device 2 through, for example, various recording media. Alternatively, the program may be installed via the Internet or the like.

The type and the like of the recording medium on which the program is recorded are not limited, and an arbitrary computer-readable recording medium may be used. For example, an arbitrary computer-readable non-transitory storage medium may be used.

As shown in FIG. 3, in this embodiment, the CPU executes a predetermined program, thereby configuring, as functional blocks, a display control unit 16, a determination unit 17, a virtual display region setting unit 18, a communication control unit 19, an execution unit 20, and a state setting unit 21. It goes without saying that in order to realize the functional blocks, dedicated hardware such as an IC (integrated circuit) may be used.

The display control unit 16 controls display of an image by the touch panel 4.

The display control unit 16 is also capable of displaying various notifications to the user on the touch panel 4.

In addition, the content of specific display control by the display control unit 16 is not limited.

In this embodiment, the touch panel 4 and the display control unit 16 function as an embodiment of a first display unit that is capable of displaying an image.

Note that in this embodiment, the touch panel 4 and the display control unit 16 execute each of a cooperation display mode and a separate display mode.

The cooperation display mode is a display mode using the integrated touch panel 12 and is executed during a connection with the second display device 3.

The separate display mode is a display mode using the touch panel 4 and is executed during a separation when it is not connected to the second display device 3.

The determination unit 17 determines a connection with a different display device that includes a touch panel.

In this embodiment, the determination unit 17 determines a connection with the second display device 3.

The specific method of determining a connection by the determination unit 17 will be described below.

In this embodiment, the determination unit 17 functions as an embodiment of a first determination unit that determines a connection with the second display device 3.

The virtual display region setting unit 18 sets a first virtual display region with which each position of the touch panel 4 is associated. Further, the virtual display region setting unit 18 sets a second virtual display region with which each position of the touch panel 4 of the second display device 3 is associated.

The first virtual display region and the second virtual display region will be described below.

In this embodiment, the virtual display region setting unit 18 functions as an embodiment of a first virtual display region setting unit.

The communication control unit 19 controls the operation of the communication unit 14. For example, the communication control unit 19 controls transmission/reception of various types of information by the communication unit 14.

In this embodiment, the communication unit 14 and the communication control unit 19 function as an embodiment of a transmission unit, a reception unit, a first transmission unit, and a first reception unit.

The execution unit 20 executes various types of processing corresponding to a contact on the touch panel 4.

For example, the execution unit 20 launches an application and executes processing according to the application. Further, the execution unit 20 may output an instruction relating to display control to the display control unit 16, and the display control unit 16 may control the operation of the touch panel 4 on the basis of the instruction.

The content of the specific processing to be executed by the execution unit 20 will be described below.

The state setting unit 21 sets the state of the first display device 2.

For example, the state setting unit 21 is capable of changing the brightness of the image to be displayed on the touch panel 4, the volume of the audio to be output by the speaker 24, the application installed on the first display device 2, and the like.

In this embodiment, the state setting unit 21 is capable of setting state information relating to the cooperation display mode.

The storage unit 22 is a storage device such as a nonvolatile memory, and an HDD, an SSD (Solid State Drive), or the like is used. In addition, an arbitrary computer-readable non-transitory storage medium may be used.

A control program for controlling the operation of the entire first display device 2 is stored in the storage unit 22.

As shown in FIG. 3, the second display device 3 further includes a camera 28, a communication unit 29, a controller 30, a storage unit 37, a microphone 38, a speaker 39, and a connector 40.

Further, the controller 30 includes, as functional blocks, a display control unit 31, a determination unit 32, a virtual display region setting unit 33, a communication control unit 34, an execution unit 35, and a state setting unit 36.

Each block of the second display device 3 operates in a way similar to that in each block of the first display device 2. The content described regarding the relationship with the "second display device" in the description of each block of the first display device 2 can be read as the "first display device" when viewed from the second display device 3.

The second display device 3 corresponds to an embodiment of a different display device that includes a second display unit that is capable of displaying an image according to the present technology.

The touch panel 7 and the display control unit 31 function as an embodiment of a second display unit that is capable of displaying an image.

The determination unit 32 functions as an embodiment of a second determination unit that determines a connection with the first display device 2.

The virtual display region setting unit 33 functions as an embodiment of a second virtual display region setting unit.

The communication unit 29 and the communication control unit 34 function as an embodiment of a transmission unit, a reception unit, a second transmission unit, and a second reception unit.

In addition, the specific configuration of the first display device 2 and the second display device 3 is not limited, and an arbitrary configuration may be adopted.

[Processing of Determining Connection]

Processing of determining a connection by the first display device 2 and the second display device 3 will be described.

Figure 4:
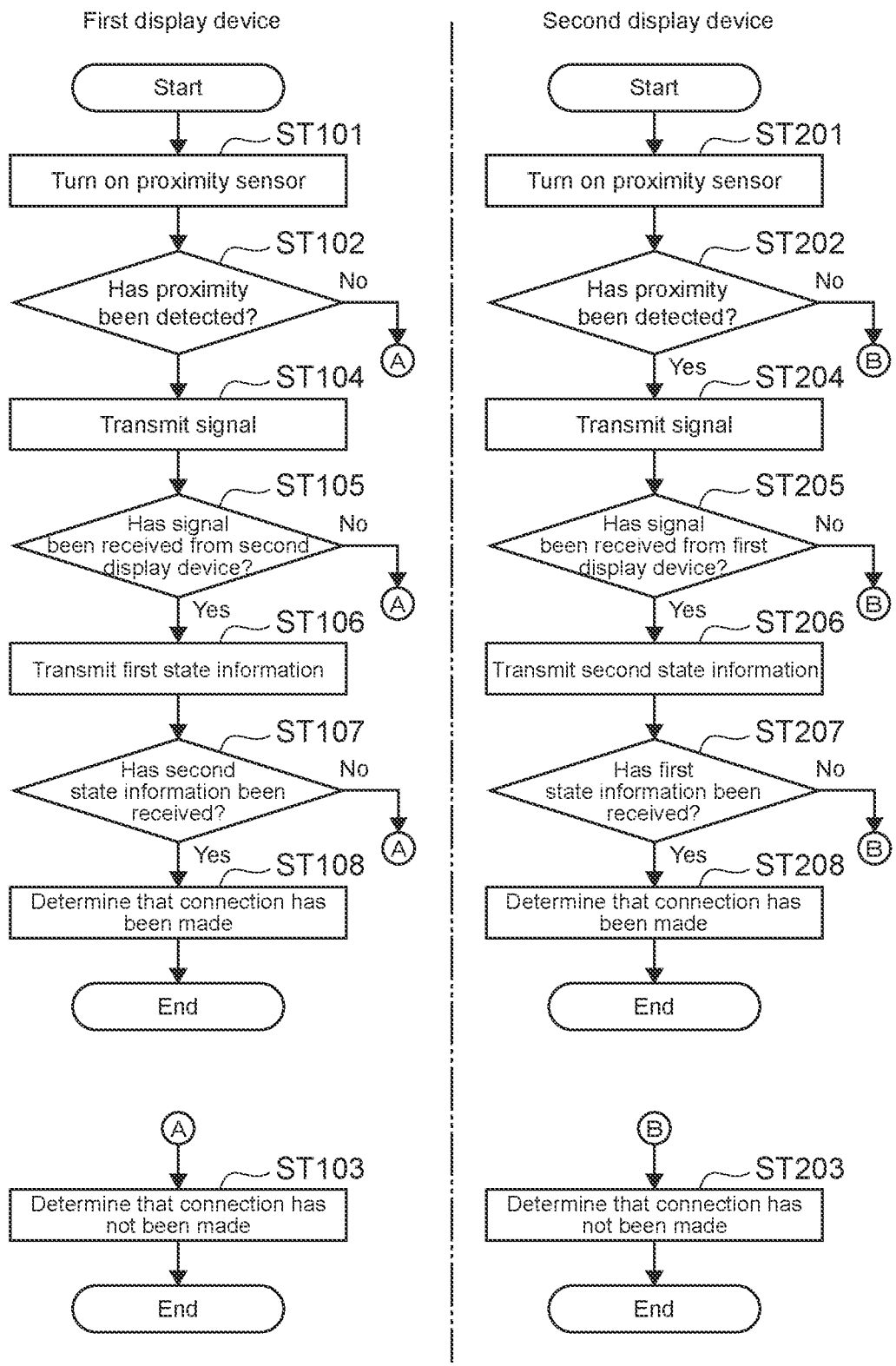
FIG. 4 is a flowchart showing an example of processing of determining a connection.

FIG. 4 is a flowchart showing an example of processing of determining a connection.

In this embodiment, each of the first display device 2 and the second display device 3 executes the same determination processing. Therefore, the determination processing by the first display device 2 will be mainly described below. The description includes content relating to "first state information" and "second state information". When understanding the content as the determination processing by the second display device 3, the "first state information" should be read as the "second state information" and the "second state information" should be read as the "first state information".

In this embodiment, a series of processes shown in FIG. 4 is executed at a predetermined frame rate.

The processes to be executed by the first display device 2 and the second display device 3 may start at the same timing or different timings.

The operation of the proximity sensor 5 of the first display device 2 is started (Step 101).

Note that, for example, in the case where the processing shown in FIG. 4 has been executed in the past and the proximity sensor 5 is already operating, the processing of Step 101 may be omitted.

The proximity sensor 5 determines whether or not proximity of an object has been detected (Step 102).

For example, in the case where the proximity sensor 5 is a ranging sensor, proximity is detected when the distance between the proximity sensor 5 and the object is smaller than predetermined threshold value. Further, proximity may be detected when the object has come into contact with the proximity sensor 5. In addition, how proximity is detected by the proximity sensor 5 is not limited.

In the case where proximity of an object has not been detected (No in Step 102), the determination unit 17 determines a connection with the second display device 3 has not been made (Step 103).

In the case where proximity of an object has been detected (Yes in Step 102), the communication unit 14 transmits a signal to the detected object (Step 104).

For example, the communication unit 14 that includes a wireless LAN module such as Wi-Fi or a communication module such as Bluetooth (registered trademark) transmits a device search signal and an inquiry signal via broadband. Further, a beacon signal or the like may be transmitted. In addition, the content of a specific signal to be transmitted by the communication unit 14 is not limited.

The determination unit 17 determines whether or not a signal has been received from the second display device 3

(Step 105). In this embodiment, whether or not a response signal to the device search signal or the like transmitted in Step 104 has bene received is determined.

Note that the communication unit 29 of the second display device 3 transmits a device search signal to the first display device 2 (Step 204).

The device search signal or the like transmitted from the second display device 3 may be used for the determination in Step 105. That is, in the case where a device search signal or the like has been received from the second display device 3, it may be determined that a signal has been received from the second display device 3.

In the case where it is determined by the determination unit 17 that a signal has not been received from the second display device 3 (No in Step 105), it is determined that a connection with the second display device 3 has not been made (Step 103).

In the case where it is determined by the determination unit 17 that a signal has been received from the second display device 3 (Yes in Step 105), the communication unit 14 transmits first state information to the second display device 3.

The first state information is state information relating to the cooperation display mode of the first display device 2. The first state information will be described below.

The determination unit 17 determines whether or not second state information has been received from the second display device 3 (Step 107).

The second state information is state information relating to the cooperation display mode of the second display device 3. The second state information will be described below.

In this embodiment, the communication unit 29 of the second display device 3 transmits second state information (Step 206).

In the case where the second state information transmitted from the communication unit 29 has been received by the communication unit 14 of the first display device 2, the determination unit 17 determines that second state information has been received from the second display device 3.

In the case where the determination unit 17 determines that second state information has not been received from the second display device 3 (No in Step 107), it is determined that a connection with the second display device 3 has not been made (Step 103).

In the case where the determination unit 17 determines that second state information has been received from the second display device 3 (Yes in Step 107), it is determined that a connection with the second display device 3 has been made (Step 108).

As described above, the determination unit 17 determines a connection with the second display device 3 on the basis of proximity of the second display device 3.

In this embodiment, particularly, the determination unit 17 determines whether or not the object whose proximity has been detected by the proximity sensor 5 is the second display device 3, and determines a connection with the second display device 3 on the basis of the determination result.

In the processing of determining a connection, the proximity sensor 5 detects proximity of an object first. After that, whether or not a signal has been received from the second display device 3 is determined.

In the case where it is determined that a signal has been received from the second display device 3, the determination unit 17 determines that the object whose proximity has been detected is the second display device 3.

Meanwhile, in the case where it is determined that a signal has not been received from the second display device 3, the determination unit 17 determines that the object whose proximity has been detected is not the second display device 3.

In this way, the determination unit 17 determines whether or not the object whose proximity has been detected is the second display device 3 by the proximity sensor 5.

Further, the determination unit 17 determines a connection with the second display device 3 on the basis of the determination result.

Specifically, in the case where it is determined by the determination unit 17 that a signal has been received from the second display device 3, processing of transmitting first state information and processing of receiving second state information are then performed, and it is determined that a connection with the second display device 3 has been made.

Meanwhile, in the case where it is determined by the determination unit 17 that a signal has not been received from the second display device 3, it is determined that a connection with the second display device 3 has not been made.

As a result, it is possible to determine a connection with the second display device 3 with high accuracy.

For example, a method of unconditionally determining, in the case where an object approaches, that a connection with the second display device 3 has been made may be considered. In this embodiment, since a process of determining whether or not a signal has been received from the second display device 3 is included, the connection can be determined with higher accuracy than such a method.

It goes without saying that how the determination unit 17 determines a connection with the second display device 3 on the basis of proximity of the second display device 3 is not limited. Processing other than the processing shown in the flowchart of FIG. 4 may be executed to determine a connection with the second display device 3.

[Processing Corresponding to Contact During Connection]

processing corresponding to a contact on the touch panels 4 and 7 in the case where the first display device 2 and the second display device 3 are connected to each other will be described.

Figure 5:
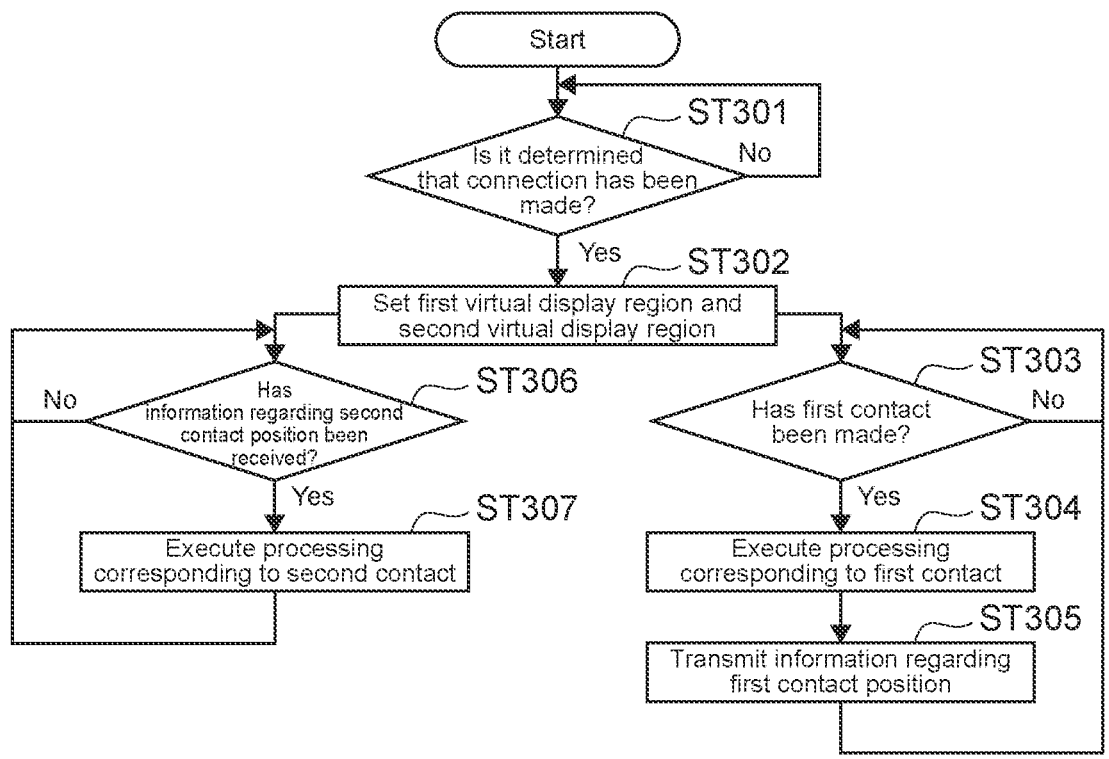
FIG. 5 is a flowchart showing an example of processing corresponding to a contact.

FIG. 5 is a flowchart showing an example of processing corresponding to a contact. For example, a series of processes shown in FIG. 5 is executed at a predetermined frame rate.

In this embodiment, the first display device 2 and the second display device 3 execute the same processing. Therefore, the processing by the first display device 2 will be mainly described. When understanding the processing as the processing by the second display device 3, the "first contact", "second contact", "information regarding a first contact position", "information regarding a second contact position", "first virtual display region", and "second virtual display region" should be respectively read as the "second contact", "first contact", "information regarding a second contact position", "information regarding a first contact position", "third virtual display region", and "fourth virtual display region".

Each of the processing executed by the first display device 2 and the processing executed by the second display device 3, which are shown in FIG. 5, corresponds to an embodiment of the display method according to the present technology.

The determination unit 17 determines a connection with the second display device 3 has been made (Step 301).

In this embodiment, the connection is determined by the processing shown in FIG. 4.

In the case where it is determined that a connection with the second display device 3 has not been made (No in Step 301), determination of a connection is executed again (Step 301).

In the case where it is determined that a connection with the second display device 3 has been made, (Yes in Step 301), a first virtual display region and a second virtual display region are set (Step 302).

In this embodiment, the virtual display region setting unit 18 sets a second virtual display region with which each position of the touch panel 7 is associated, in association with a first virtual display region with which each position of the touch panel 4 is associated.

Figure 6:
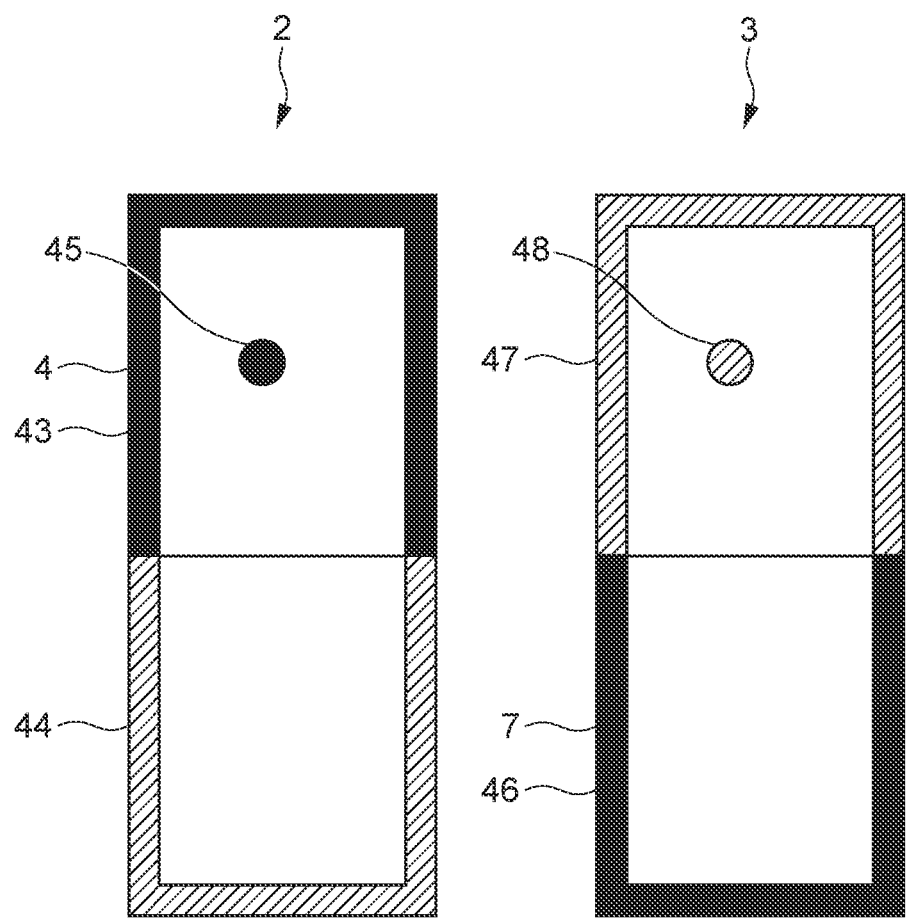
FIG. 6 is a schematic diagram for describing a virtual display region.

FIG. 6 is a schematic diagram for describing a virtual display region.

The touch panel 4 is illustrated at the upper left of FIG. 6. Further, the portion corresponding to the touch panel 4 is also a schematic illustration of a first virtual display region 43.

A second virtual display region 44 is schematically illustrated below the touch panel 4.

Further, a contact position 45 on the touch panel 4 is schematically illustrated by a black circle.

For example, coordinates (X-coordinate and Y-coordinate) are set on the touch panel 4.

Specifically, the X-coordinate of the touch panel 4 is set to correspond to the right and left direction. The touch panel 4 has coordinate values of 1 to 100 as the X-coordinate. The position corresponding to the right end is set as the "X-coordinate: 100", and the position corresponding to the left end is set as the "X-coordinate: 1".

Similarly, the Y-coordinate is set to correspond to the up-and-down direction. The position corresponding to the upper end of the touch panel 4 is set as the "Y-coordinate: 100", and the position corresponding to the lower end is set as the "Y-coordinate: 1".

Note that these coordinate values are merely examples, and the coordinate value may have an arbitrary numerical range.

In the case where the touch panel 4 is touched, the contact position is represented by coordinate values. For example, the contact position 45 of the contact near the center of the touch panel 4 shown in FIG. 6 is represented by the "X-coordinate: 49" and the "Y-coordinate: 51".

The first virtual display region 43 is set as a non-physical virtual display region (virtual display) having the same coordinate values as those of the touch panel.

That is, the first virtual display region 43 provides information where each of the X-coordinate and the Y-coordinate has a coordinate value of 1 to 100.

In the case where the "X-coordinate: 49" and the "Y-coordinate: 51" of the touch panel 4 is touched, processing corresponding to the contact is executed on the basis of the same position "X-coordinate: 49" and "Y-coordinate: 51" on the first virtual display region 43. In this way, each position of the touch panel 4 is associated with the first virtual display region 43.

The first virtual display region 43 is set by the state setting unit 21 and is stored in, for example, the storage unit 22.

Further, the state setting unit 21 sets the second virtual display region 44. Similarly to the first virtual display region 43, each position of the touch panel 7 of the second display device 3 is associated with the second virtual display region 44.

For example, in the case where the touch panel 7 has coordinate values of 1 to 100 as the X-coordinate and the Y-coordinate, the second virtual display region 44 provides information where each of the X-coordinate and the Y-coordinate has a coordinate value of 1 to 100.

In order to set the second virtual display region 44, information relating to the coordinate values of the touch panel 7 may be received by the communication unit 14.

in this embodiment, the virtual display region setting unit 18 sets the second virtual display region 44 in association with the first virtual display region 43.

Specifically, the second virtual display region 44 is set such that the value of the "next coordinate" of the "Y-coordinate: 1" of the first virtual display region 43 is the "Y-coordinate: 100" of the second virtual display region 44.

For example, in the case where the "Y-coordinate: 2" of the touch panel 4 is touched and the contact position has moved downward by the amount corresponding to three coordinates, the contact position after the movement is the "Y-coordinate: 99" of the touch panel 7 because the touch panels 4 and 7 are connected to each other in the up-and-down direction.

Even in the case where there is such a contact and movement of the contact position, coordinates can be calculated, e.g., the coordinate three coordinates below the "Y-coordinate: 2" of the first virtual display region 43 is the "Y-coordinate: 99" of the second virtual display region 44, because the value of the coordinate next to the "Y-coordinate: 1" of the first virtual display region 43 is set to the "Y-coordinate: 100" of the second virtual display region 44 (i.e., the Y-coordinates are continuous).

This allows processing to be performed in accordance with the state in which the touch panels 4 and 7 are actually connected to each other.

It goes without saying that the specific method of setting the second virtual display region 44 in association with the first virtual display region 43 by the virtual display region setting unit 18 is not limited.

For example, in the case where the touch panels 4 and 7 are connected to each other in the right and left direction, the second virtual display region 44 may be set such that the value of the coordinate next to the "X-coordinate: 1" of the first virtual display region 43 is the "X-coordinate: 100" of the second virtual display region 44.

Whether or not there a first contact has been made is determined (Step 303).

The first contact is a contact on the touch panel 4 of the first display device 2.

That is, the contact position 45 shown in FIG. 6 corresponds to the position of the first contact. Hereinafter, the position of the first contact will be referred to as a first contact position 45 using the same reference symbol.

The determination is executed by, for example, the determination unit 17. It goes without saying that the present technology is not limited thereto, and the determination may be executed by an arbitrary functional block.

In the case where it is determined that a first contact has not been made (No in Step 303), determination of a first contact is executed again (Step 303).

In the case where it is determined that a first contact has been made (Yes in Step 303), processing corresponding to the first contact is executed (Step 304).

In this embodiment, first, information regarding a first contact position is generated in accordance with the first contact.

Specifically, the coordinate values on the touch panel 4 where a first contact has been made are generated as information regarding a first contact position. That is, the information regarding a first contact position is information of the "X-coordinate: 49" and the "Y-coordinate: 51".

The information regarding a first contact position is generated by, for example, the execution unit 20. However, it goes without saying that the present technology is not limited thereto.

Further, the execution unit 20 executes processing corresponding to the first contact on the basis of the position on the first virtual display region 43 corresponding to the first contact position 45.

The position on the first virtual display region 43 corresponding to the first contact position 45 is the same coordinate values on the first virtual display region 43 as the coordinate values of the first contact position 45 on the touch panel 4. That is, processing is executed on the basis of the position of the "X-coordinate: 49" and the "Y-coordinate: 51" on the first virtual display region 43.

For example, an icon of an application is displayed at the "X-coordinate: 49" and the "Y-coordinate: 51" of the touch panel 4, and a user touches the coordinates of the touch panel 4 to execute the application.

In this case, the execution unit 20 outputs an instruction relating to display control to the display control unit 16, and the upper half of the screen of the application is displayed on the touch panel 4.

Further, processing corresponding to the type (touch, swipe, pinch, etc.) of contact by a user may be executed.

Execution of an application and the like are generally referred to as a "key event" or the like in some cases.

In addition, the content of specific processing by the execution unit 20 is not limited, and arbitrary processing may be executed.

Information regarding a first contact position is transmitted (Step 305).

Specifically, the communication unit 14 transmits, to the second display device 3 determined to be connected by the determination unit 17, information regarding a first contact position generated in accordance with the first contact on the touch panel 4.

After that, determination of a first contact is executed again (Step 303).

Further, after the first virtual display region 43 and the second virtual display region 44 are set in Step 302, whether or not information regarding a second contact position has been received is determined (Step 306).

Specifically, the communication unit 14 receives, from the second display device 3 determined to be connected by the determination unit 17, information regarding a second contact position generated in accordance with the second contact on the touch panel 7.

Note that the processing of Step 306 may be started at the same timing as that of the processing of Step 303 or may be started at a different timing.

The series of processes shown in FIG. 5 is also executed in the second display device 3, and information regarding a second contact position is generated in the processing corresponding to Step 304.

For example, as the information regarding a second contact position, information regarding coordinate values such as the "X-coordinate: 49" and the "Y-coordinate: 51" is generated similarly to the information regarding a first contact position.

The generated information regarding a second contact position is transmitted to the first display device in the processing corresponding to Step 305. Then, in Step 306, the information is received by the first display device 2.

In the case where information regarding a second contact position has not been received (No in Step 306), whether or not information regarding a second contact position has been received is determined again (Step 306).

In the case where information regarding a second contact position has been received (Yes in Step 306), processing corresponding to the second contact is executed (Step 307).

Specifically, the execution unit 20 executes processing corresponding to a second contact on the basis of the position on the second virtual display region 44 corresponding to the received information regarding a second contact position.

For example, an icon of an application is displayed at the "X-coordinate: 10" and the "Y-coordinate: 10" of the touch panel 7 of the second display device 3, and a user touches the coordinates of the touch panel 7 to execute the application.

In this case, as information regarding a second contact position, information of the "X-coordinate: 10" and the "Y-coordinate: 10" is received by the first display device 2.

The coordinates of the icon of the application displayed on the touch panel 7 are shared with the first display device 2. Then, the execution unit 20 determines, on the basis of the position (the "X-coordinate: 10" and the "Y-coordinate: 10") on the second virtual display region 44 corresponding to the received information regarding a second contact position, that the user has touched the coordinates of the icon of the application on the side of the touch panel 7.

Then, the execution unit 20 outputs an instruction regarding display control to the display control unit 16, and the upper half of the screen of the application is displayed on the touch panel 4.

After that, whether or not information regarding a second contact position has been received is determined again (Step 306).

The processing shown in FIG. 5 is similarly executed also in the second display device 3.

In this embodiment, the virtual display region setting unit 33 sets, in the case where it is determined by the determination unit 32 that a connection with the first display device 2 has been made, a fourth virtual display region with which each position of the touch panel 4 is associated, in association with a third virtual display region with which each position of the touch panel 7 is associated.

The third virtual display region and the fourth virtual display region are set similarly to the first virtual display region 43 and the second virtual display region 44.

The touch panel 7 is illustrated at the lower right of FIG. 6. Further, the portion corresponding to the touch panel 7 is also a schematic illustration of a third virtual display region 46.

A fourth virtual display region 47 is schematically illustrated above the touch panel 7.

Further, a position 48 that is a position on the fourth virtual display region 47 corresponding to the first contact position is schematically illustrated by a diagonally hatched circle.

As shown in FIG. 6, the first contact position 45 in the touch panel 4 and the position 48 on the fourth virtual display region 47 corresponding to the first contact position 45 are the same position.

As described above, setting of the first virtual display region 43, the second virtual display region 44, the third virtual display region 46, and the fourth virtual display region 47, and processing corresponding to the first contact and the second contact are executed.

The first contact and the second contact are generally referred to as a "touch event" or the like in some cases.

Note that the specific processing corresponding to a contact during connection is not limited to the example shown in FIG. 5, and arbitrary processing may be executed.

[Display Mode]

In this embodiment, the touch panel 4 executes, in the case where it is determined by the determination unit 17 that a connection with the second display device 3 has been made, a cooperation display mode for displaying an image in cooperation with the touch panel 7.

The display mode to be executed by the touch panel 4 of the first display device 2 and the touch panel 7 of the second display device 3 will be described.

The touch panels 4 and 7 are capable of executing similar operations regarding the display mode. Therefore, execution of the display mode by the touch panel 4 of the first display device 2 will be mainly described.

The display mode is a method of displaying an image by the touch panel 4.

In this embodiment, as the display mode, two display mods of a "cooperation display mode" and a "separate display mode" are executed.

The cooperation display mode is a display mode in which the touch panel 4 and the touch panel 7 operates as one screen (the integrated touch panel 12) and display one image.

The cooperation display mode is executed during connection with the second display device 3.

For example, as shown in FIG. 2, the touch panels 4 and 7 operate in cooperation with each other to display one character "A" on the integrated touch panel 12.

Note that the content of display by the integrated touch panel 12 is not limited to a character, and a UI or the like may be drawn during connection.

The separate display mode is a display mode in which the touch panel 4 independently displays an image without cooperating with the touch panel 7.

The separate display mode is executed during a separation when it is not connected to the second display device 3.

For example, as shown in FIG. 1, a character "A" is displayed on only the touch panel 4.

In the case where the first display device 2 and the second display device 3 are newly connected to each other, the display mode of the touch panel 4 is switched from the separate display mode to the cooperation display mode. Further, in the case where the first display device 2 and the second display device 3 are newly separated from each other, the display mode of the touch panel 4 is switched from the cooperation display mode to the separate display mode.

In this way, the display mode is switched in accordance with the connection between the first display device 2 and the second display device 3.

Although a character "A" is displayed in both the separate display mode and the cooperation display mode in the case where the display mode is switched in the example shown in FIG. 1 and FIG. 2, the content of display of an image may be changed in the case where the display mode is switched.

For example, at the time of a separation, the touch panel 4 displays a picture of a "tool A" and the touch panel 7 displays a picture of a "tool B". In the case where the first display device 2 and the second display device 3 are newly connected to each other, the integrated touch panel 12 newly displays a picture of a "tool C" relating to the tool A and the tool B. Such control of display content may be performed.

The display of a UI may be switched in accordance with switching between the separate display mode and the cooperation display mode.

In addition, the specific control method of display content corresponding to the display mode is not limited.

By executing the cooperation display mode, it is possible to display an image on a large screen. As a result, it is possible to improve user convenience by, for example, making it easier to visually recognize an image.

[State Information]

The specific content of the first state information and the second state information will be described below.

Note that since the specific content of the second state information is similar to the content of the first state information, the first state information will be mainly described.

The first state information is state information relating to the cooperation display mode of the first display device 2. Typically, information regarding the state that needs to be appropriately set in order to execute the cooperation display mode is the first state information.

In this embodiment, for example, the value of a setting item of the terminal is transmitted as the first state information to the second display device 3. Specifically, information such as the brightness of image display by the touch panel 4, the image quality, and the volume of audio output by the speaker 24 corresponds to the value of the setting item of the terminal.

For example, if the brightness of image display by each of the touch panels 4 and 7 extremely differs, execution of the cooperation display mode is hindered. In order to prevent this, it is necessary to appropriately set the brightness of image display by the touch panel 4 and match the settings of the two display devices during a connection.

Note that during a separation, settings of the value of the setting item of the terminal and the like may be freely changed in each display device.

Further, as the first state information, the drawing content of a first virtual display region may be transmitted.

For example, the drawing content of the first virtual display region is generated corresponding to the drawing content (display content) of the touch panel 4. Specifically, in the case where the display color at the "X-coordinate: 50" and the "Y-coordinate: 50" of the touch panel 4 is "R: 255", "G: 0", and "B: 0" (red), a set of pieces of information of the "X-coordinate: 50", the "Y-coordinate: 50", "R: 255", "G: 0", and "B: 0" as a set of coordinate values on the first virtual display region 43 and RGB values.

Such information of a set of coordinate values and RGB values is generated for each coordinate value, thereby providing the drawing content of the first virtual display region.

It goes without saying that such content of information is merely an example, the specific drawing content of the first virtual display region is not limited.

Further, as the first state information, the content of the memory other than information regarding drawing on the touch panel 4 may be transmitted.

For example, information stored in the memory, such as the internal processing state of an application, is transmitted.

Further, as the first state information, information stored in the HDD may be transmitted.

Specifically, for example, information regarding the application installed in the first display device 2 is transmitted.

Meanwhile, for example, the remaining battery level of the first display device 2 is relatively unimportant when executing the cooperation display mode. For example, even if there is a difference in the remaining battery level, such as the remaining battery level of the first display device 2 being 20% and the remaining battery level of the second display device 3 being 80%, the first display device 2 and the second display device 3 independently operate using their respective batteries, and thus, there is no problem in executing the cooperation display mode.

Information regarding such a state does not necessarily need to be included in the first state information.

Note that during a connection, the respective remaining battery levels, e.g., "20%" and "80%", may be displayed side by side at the upper right of the integrated touch panel 12 (corresponding to the upper right portion in FIG. 2). This notifies the user that the remaining battery level of the first display device 2 is 20% and the remaining battery level of the second display device 3 is 80%. Therefore, the user can determine that the remaining battery level of the first display device is low and the first display device needs to be charged.

In addition, the specific content of the first state information is not limited.

[Transmission/Reception of State Information]

The communication unit 14 transmits, to the second display device 3 determined to be connected by the determination unit 17, first state information that is state information relating to the cooperation display mode of the first display device 2.

Further, the communication unit 14 receives, from the second display device 3 determined to be connected by the determination unit 17, second state information that is state information relating to the cooperation display mode of the second display device 3.

For example, transmission of first state information and reception of second state information are executed in the processing of determining a connection shown in FIG. 4 immediately before the connection between the first display device 2 and the second display device 3.

Further, in this embodiment, transmission of first state information and reception of second state information are executed at, for example, a predetermined frame rate also during the connection between the first display device 2 and the second display device 3.

[Synchronization Processing]

In this embodiment, synchronization processing is executed such that the states relating to the cooperation display mode of the first display device 2 and the second display device 3 match.

Specifically, the state setting unit 21 sets the state relating to the cooperation display mode of the first display device 2 such that the first state information and the second state information received by the communication unit 14 match.

For example, during a connection between the first display device 2 and the second display device 3, second state information is received at a predetermined frame rate.

Specifically, in the case where the brightness of the image display by the touch panels 4 and 7 is represented by a value of 0 to 100, information indicating that "the brightness of image display is 50" is received as second state information.

For example, in the case where the brightness of image display by the touch panel 4 is 30 when the second state information was received, the first state information is information indicating that "the brightness of image display is 30". That is, there is a difference between the first state information and the second state information.

In this case, the state setting unit 21 changes the brightness of image display to 50. After the change, the first state information is information indicating that "the brightness of image display is 50" and matches the second state information.

Note that in addition to the brightness, it is necessary to match the image quality of the images displayed by the touch panels 4 and 7, the volume of the audio output by the speakers 24 and 39, or the like. The state setting unit 21 may function so as to match such information.

Further, the application installed on the second display device 3 may be installed on the first display device 2 similarly. Such an operation can be achieved by a method such as copying a difference between HDDs or memories.

As a result, it is possible to match the first state information with the second state information indicating that, for example, "the installed applications are A, B, and C".

By executing the synchronization processing (processing of matching the state relating to the cooperation display mode) in this way, it is possible to execute the cooperation display mode without any problems.

Note that the specific timing of the synchronization processing is not limited.

For example, in the case where the first display device 2 and the second display device 3 are newly connected to each other, the synchronization processing is executed immediately after the connection.

In this embodiment, in the case where transmission of first state information and reception of second state information have been completed, it is determined by the determination unit 17 that a connection with the second display device 3 has been made.

That is, in the processing of determining a connection shown in FIG. 4, transmission of first state information and reception of second state information are executed immediately before the connection. Then, after the transmission and the reception are completed, it is determined that a connection with the second display device 3 has been made.

Since second state information is received immediately before the connection in advance as described above, it is possible to execute the synchronization processing immediately after the connection. By executing the synchronization processing immediately after the connection, it is possible to stably execute the cooperation display mode after the connection.

Further, the synchronization processing may be executed immediately before the connection.

For example, in the processing of determining a connection, transmission of first state information and reception of second state information are executed. Further, the state setting unit 21 sets first state information such that the first state information and second state information match.

Then, in the case where it is determined that the first state information and the second state information match, the determination unit 17 determines that a connection between the first display device 2 and the second display device 3 has been made.

Alternatively, the synchronization processing may be executed in the case where a synchronization shift (difference in state information) has been detected.

Specifically, in the case where it is determined that a connection with the second display device 3 has been made, the determination unit 17 determines a difference between the first state information and the second state information received by the communication unit 14. Further, in the case where it is determined by the determination unit 17 that there is the difference, the state setting unit 21 sets the state relating to the cooperation display mode of the first display device 2 such that the first state information and the second state information received by the communication unit 14 match.

That is, only in the case where the determination unit 17 determines whether or not there is a difference between the first state information and the second state information and there is the difference, the state setting unit 21 sets the state of the first display device 2.

The setting of the state is performed such that the first state information and the second state information match.

In this case, the determination of a difference by the determination unit 17 may be executed at an arbitrary timing.

For example, the determination unit 17 determines a difference between the first state information and the second state information received by the communication unit 14 at a predetermined period.

Determination of a difference may be executed substantially in a continuous manner at a very high frame rate (short period). Alternatively, determination of a difference may be executed at a low frame rate (long period) such as once every 10 seconds.

As a result, the synchronization shift is corrected immediately, and thus, it is possible to stably execute the cooperation display mode.

The determination unit 17 may determine a difference between the first state information and the second state information received by the communication unit 14 in accordance with a user's instruction.

For example, a synchronization button is formed on the first display device 2 as a physical button. Alternatively, an application for synchronization is installed on the first display device 2.

In the case where a user presses the synchronization button or starts the application, the determination unit 17 executes determination of a difference.

As a result, it is possible for the user to execute determination of a difference at a desired timing. For example, in the case where the user perceives that two screens are not consistent due to a difference in brightness of the screen, he/she can cause determination of a difference to be executed.

Further, since determination of a difference is not constantly being performed, the processing load on the CPU and the like is reduced.

Note that the specific content of an instruction from the user is not limited to pressing the synchronization button or the like and may be arbitrary content.

Further, by initializing the state of each of the first display device 2 and the second display device 3, the synchronization processing may be executed.

Specifically, the state setting unit 21 sets the state relating to the cooperation display mode of the first display device 2 to the initial state.

For example, in the first display device 2, predetermined information regarding the initial state, such as "display a home screen by the touch panel 4", is stored in the storage unit 22.

Further, in the second display device 3, information regarding the same initial state as that of the first display device 2 is stored in the storage unit 37. That is, information "display a home screen by the touch panel 7" is stored.

In the first display device 2, the state setting unit 21 sets the state of the first display device 2 to the initial state on the basis of the information regarding the initial state stored in the storage unit 22. That is, the touch panel 4 displays a home screen.

Meanwhile, also in the second display device 3, the state setting unit 36 sets the state to the initial state on the basis of the information regarding the initial state stored in the storage unit 37. That is, the touch panel 7 displays a home screen.

That is, the states of the first display device 2 and the second display device 3 match. Further, the first state information and the second state information also match.

By setting the states of the first display device 2 and the second display device 3 to the same initial state in this way, synchronization processing is executed.

As a result, for example, the first display device 2 is capable of performing synchronization processing without needing to receive second state information. Therefore, the processing load on the CPU and the like is reduced.

Further, for example, such synchronization processing may be executed immediately after the connection, and the integrated touch panel 12 may display a home screen at the moment of the connection. In addition, the specific method of synchronization processing is not limited.

[Settings of Parent Device and Child Device]

In this embodiment, the state setting unit 21 sets one of the first display device 2 and the second display device 3 determined to be connected by the determination unit 17 as a parent device and the other as a child device.

An overview of the settings of the parent device and the child device will be described below.

For example, after the first display device 2 and the second display device 3 are connected to each other, a user opens a setting screen by operating the touch panel 4, and selects which of the first display device 2 and the second display device 3 is to be set as a parent device and which thereof as a child device. Alternatively, a dedicated setting application may be executed.

The state setting unit 21 acquires the content of selection made by the user, and one of the first display device 2 and the second display device 3 is set as a parent device and the other is set as a child device.

In this embodiment, assumption is made that the first display device 2 and the second display device 3 are shared and used by a parent and a child or friends.

For example, the first display device 2 and the second display device 3 are sold as a set of two devices (smartphones, etc.) and purchased by a parent and a child. The parent usually uses the two devices in the integrated state, and can separate one of the two devices as necessary and hand it to his/her child to use.

Alternatively, the devices may be sold individually rather than as a set, and the devices may be connected and used by users who have the devices according to the present technology.

Note that the name of the display mode "cooperation display mode" is merely an example, and an arbitrary name such as "parent-child mode" and "friend mode" may be used in accordance with the assumed user group. The same also applies to the "separate display mode".

In the case where two devices are used by a parent and child, it is desirable that the device used by the parent is capable of controlling the device used by the child to some extent.

For this purpose, the device to be used by the parent is set as a parent device, and the device to be used by the child is set as a child device. Further, in this embodiment, the child device operates in accordance with the parent device, e.g., the state of the child device is set to match the state of the parent device.

By setting the parent device and the child device, each of the devices is capable of executing an operation according to the relationship between the users who use the devices.

Note that a user may be able to set a parent device and a child device by operating the second display device 3 instead of the first display device 2. That is, the state setting unit 36 of the second display device 3 may execute settings of a parent device and a child device.

Alternatively, at the stage when the first display device 2 and the second display device 3 are produced, one of them may be designed as a parent device and the other may be designed as a child device.

In addition, the specific method of setting a parent device and a child device is not limited.

In this embodiment, synchronization processing is executed by setting the state of the child device to match the state of the parent device.

Specifically, the state setting unit 21 sets, in the case where the first display device 2 is set as a child device, the state relating to the cooperation display mode of the first display device 2 such that the first state information matches the second state information received from the second display device 3 set as a parent device.

Meanwhile, the parent device (second display device 3) may only transmit second state information to the child device (first display device 2) and does not necessarily need to set the state.

As a result, it is possible to execute synchronization processing according to the relationship between the users who use the devices, e.g., the state of the device used by the child is caused to match the state of the device used by the user who is the parent of the child.

Note that conversely, the first display device 2 may be set as a parent device and the second display device 3 may be set as a child device. In this case, the state of the second display device 3 is set to match the state of the first display device 2.

Further, the first display device 2 and the second display device 3 may operate without distinguishing between the parent device and the child device.

[Reproduction of State Immediately Before Connection]

The state immediately before a connection may be reproduced when the first display device 2 and the second display device 3 are separated from each other.

Specifically, the state setting unit 21 sets, in the case where it is determined by the determination unit 17 that a separation from the second display device 3 has been newly made, the state relating to the cooperation display mode of the first display device 2 such that the first state information and the first state information immediately before the connection with the second display device 3.

For example, the first state information immediately before the first display device 2 and the second display device 3 are connected to each other is stored in the storage unit 22.

In the case where it is determined by the determination unit 17 that the first display device 2 and the second display device 3 are newly separated from each other, the first state information immediately before the connection stored in the storage unit 22 is acquired by the state setting unit 21 and the state of the first display device 2 is set.

Note that it is determined that "a separation from the second display device 3 has newly been made" in the case where the state where the determination unit 17 has determined that the first display device 2 and the second display device 3 are connected to each other is switched to the state where it is determined that they are not connected to each other.

For example, in the case where a child device is connected to a parent device, the state of the child device is changed to match the state of the parent device. Therefore, the content of settings such as the brightness of display of a screen, which were set in the child device before the connection, is lost.

By reproducing the state of the child device before the connection when the child device and the parent device are separated from each other, it is unnecessary for the user to set the state of the child device again each time the separation. This makes it possible to improve user convenience.

Note that the reproduction of the state may be executed in the second display device 3. That is, the storage unit 37 of the second display device 3 may store the second state information immediately before the two display devices are connected to each other. Then, in the case where the two display devices are newly separated from each other, the second state information immediately before the connection stored in the storage unit 37 may be acquired by the state setting unit 36 and the state of the second display device 3 may be set.

Further, conversely, the state immediately before the separation may be reproduced when the first display device 2 and the second display device 3 are connected to each other.

Also in this case, processing similar to that of the reproduction of the state immediately before the connection is executed.

[Restriction on Changes in Settings During Separation]

Changes in settings may be restricted during a separation of the first display device 2 and the second display device 3.

For example, in the case where it is determined by the determination unit 17 that a connection with the second display device 3 has not been made, a change in the state relating to the cooperation display mode by the state setting unit 21 is restricted. That is, changes in settings such as the brightness of display of a screen and the volume are restricted.

Further, during a separation, installation and uninstallation of an application may be restricted. This restricts a change in information stored in the HDD.

For example, the display of an icon of an application for setting an application is grayed out and cannot be selected by a user. Further, when a user attempts to perform an installation or the like, a dialog may be used to notify that the processing cannot be executed.

In this case, installation and the like of all applications may be restricted, or installation and the like of only some applications may be restricted.

Further, processing that may change the state relating to the cooperation display mode, such as network processing, may be restricted. In addition, the content of processing to be restricted during a separation is not limited.

This makes it difficult for differences to occur between the states of the first display device 2 and the second display device 3 during a separation. Therefore, it is possible to stably execute the cooperation display mode during a connection.

Further, for example, it is possible to prevent, in the case where the first display device 2 and the second display device 3 are used by a parent and a child, an unintended operation, e.g., the child accidentally uninstalls an application, from being executed.

Changes in some states relating to the cooperation display mode may be restricted during a separation, and synchronization processing may be performed on only the states that are not restricted during a connection.

That is, hybrid processing of the "restriction of changes in settings during a separation" and "synchronization processing during a connection" may be executed.

For example, during a separation, the change in the brightness of a screen is restricted, and the change in the volume is not restricted. During a connection, synchronization processing is executed on only the volume, and synchronization processing is not executed on the brightness of a screen.

This eliminates the need for synchronization processing during a connection for the states where there is no possibility of change (difference occurring) during a separation, and thus, the processing load on the CPU and the like is reduced, for example.

[Operation Possible During Separation]

A predetermined operation by the first display device 2 may be possible only during a separation of the first display device 2 and the second display device 3.

For example, in the case where it is determined by the determination unit 17 that a connection with the second display device 3 has not been made, execution of a predetermined operation by the execution unit 20 is possible. Meanwhile, in the case where it is determined by the determination unit 17 that a connection with the second display device 3 has been made, the execution unit 20 does not execute the predetermined.

For example, execution of an application as the predetermined operation is possible only during a separation.

In the case where the first display device 2 and the second display device 3 are used by a parent and a child, for example, an application for children (such as an educational application) is installed on the child device used by the child.

In this case, execution of the application is possible only during a separation of the parent device and the child device. That is, during a connection, the application cannot be executed. However, the parent separates the child device and hands it to the child, and thus, execution of the application is possible.

This prevents, for example, an application that is expected to be executed while a parent device and a child device are separated from being executed during a connection.

Conversely, only during a connection, a predetermined operation by the first display device 2 may be possible.

This makes it possible to prevent, for example, an inappropriate application or the like from being executed when the child device is separated and the child is using the child device in a place where the parent cannot see.

[Massage Prompting Separation]

In the case where an attempt is made to execute an operation possible only during a separation during a connection, a massage prompting a separation may be displayed.

Figure 7:
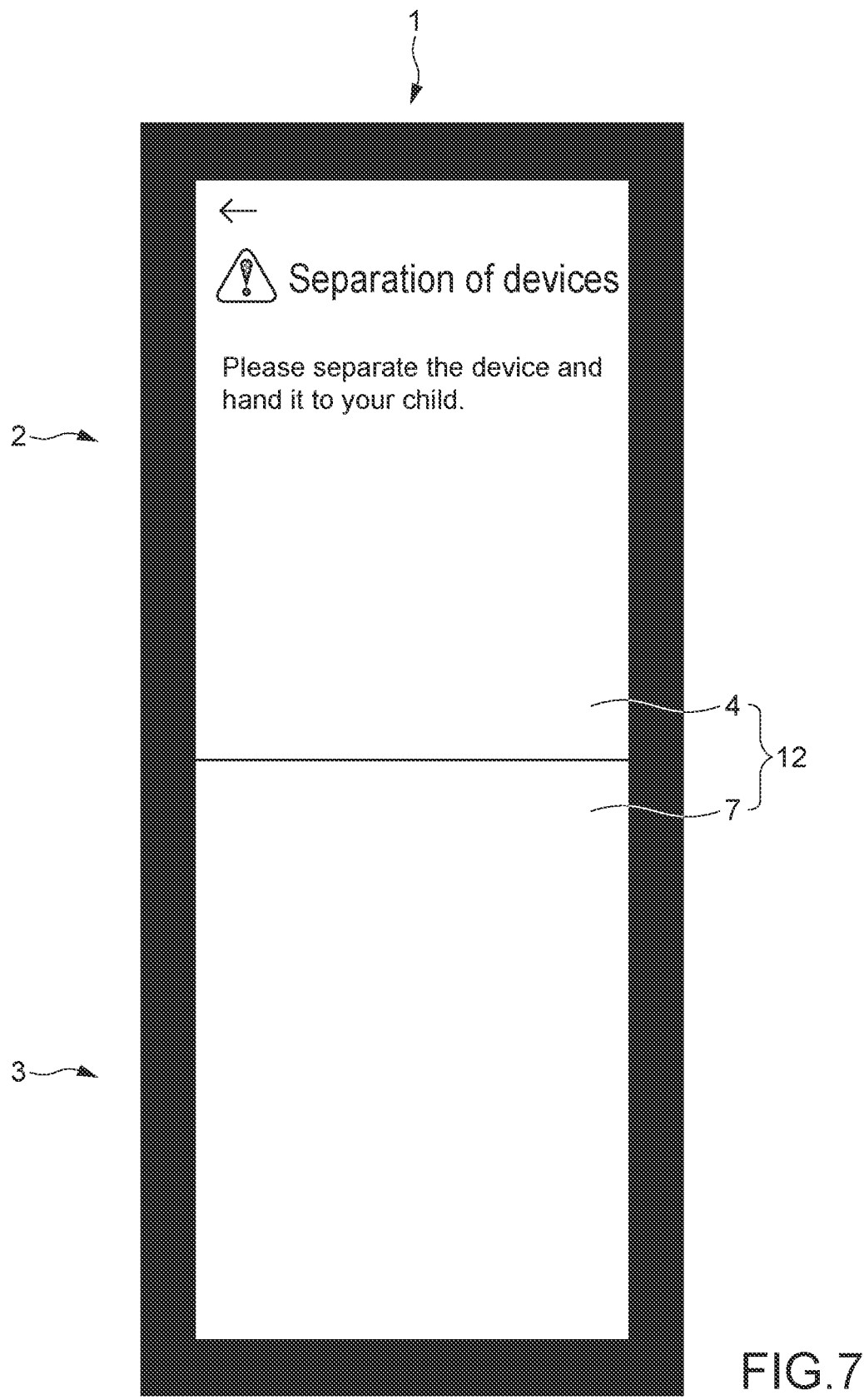
FIG. 7 is a diagram showing a massage prompting a separation.

FIG. 7 is a diagram showing a massage prompting a separation.

For example, in the case where an icon of an application that can be executed only during a separation is pressed, a message is displayed on the integrated touch panel 12 as shown in FIG. 7.

In the example shown in FIG. 7, a massage "Please separate the device and hand it to your child." prompting a separation of a parent device and a child device is displayed.

It goes without saying that the specific content of the message is not limited. Further, a notification prompting a separation may be made by voice or the like.

[Selection of Operation Possible During Separation]

A user may be caused to select, during a connection, an operation that can be executed by the first display device 2 during a separation.

For example, in the case where a parent separates a child device and hands it to his/her child, an application that he/she wants his/her child to use is selected. Specifically, an application that can be executed during a separation is selected by a setting application of post-separation behavior.

Figure 8:
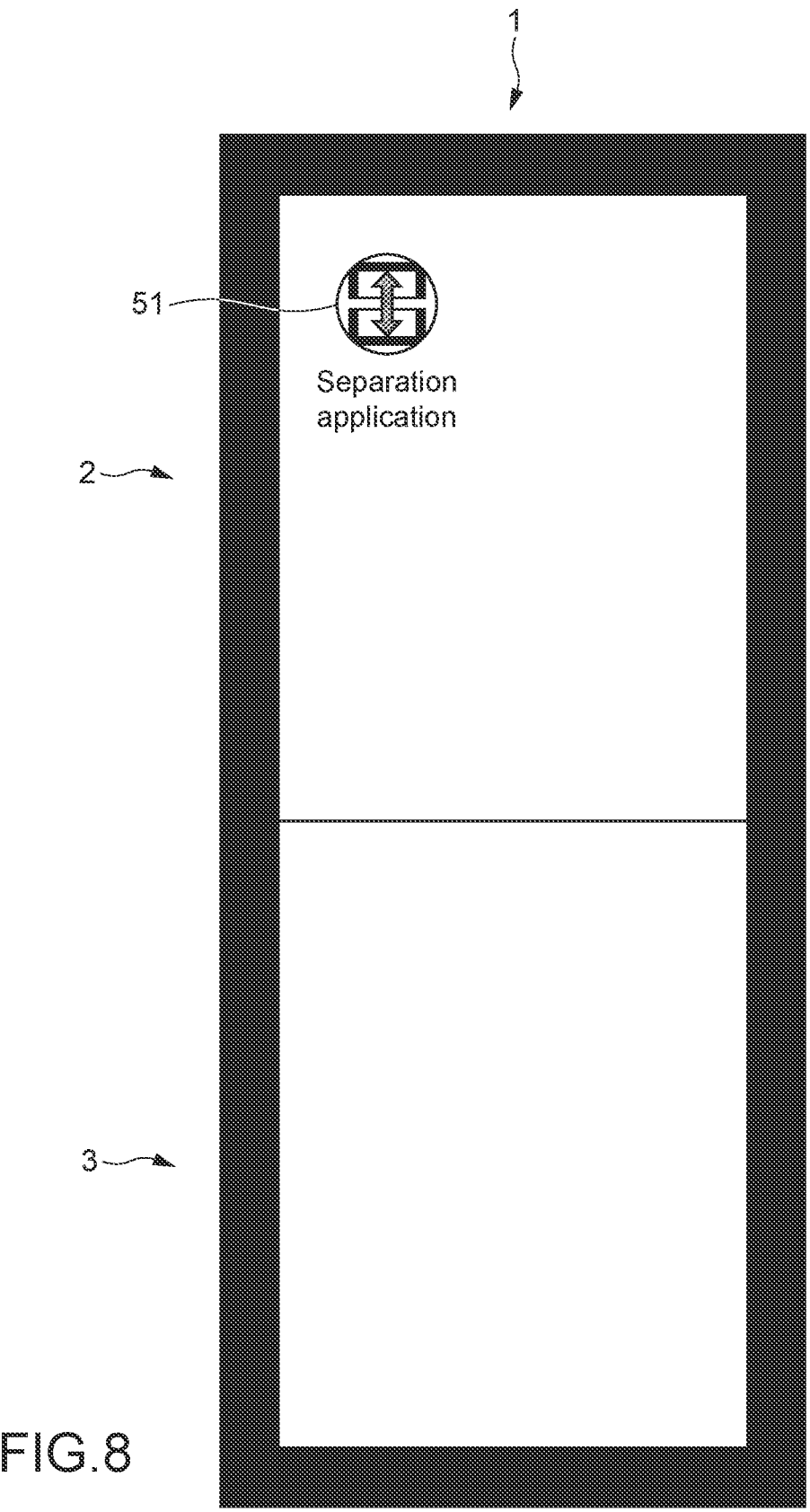
FIG. 8 is a diagram showing an example of an icon of a setting application.
Figure 9:
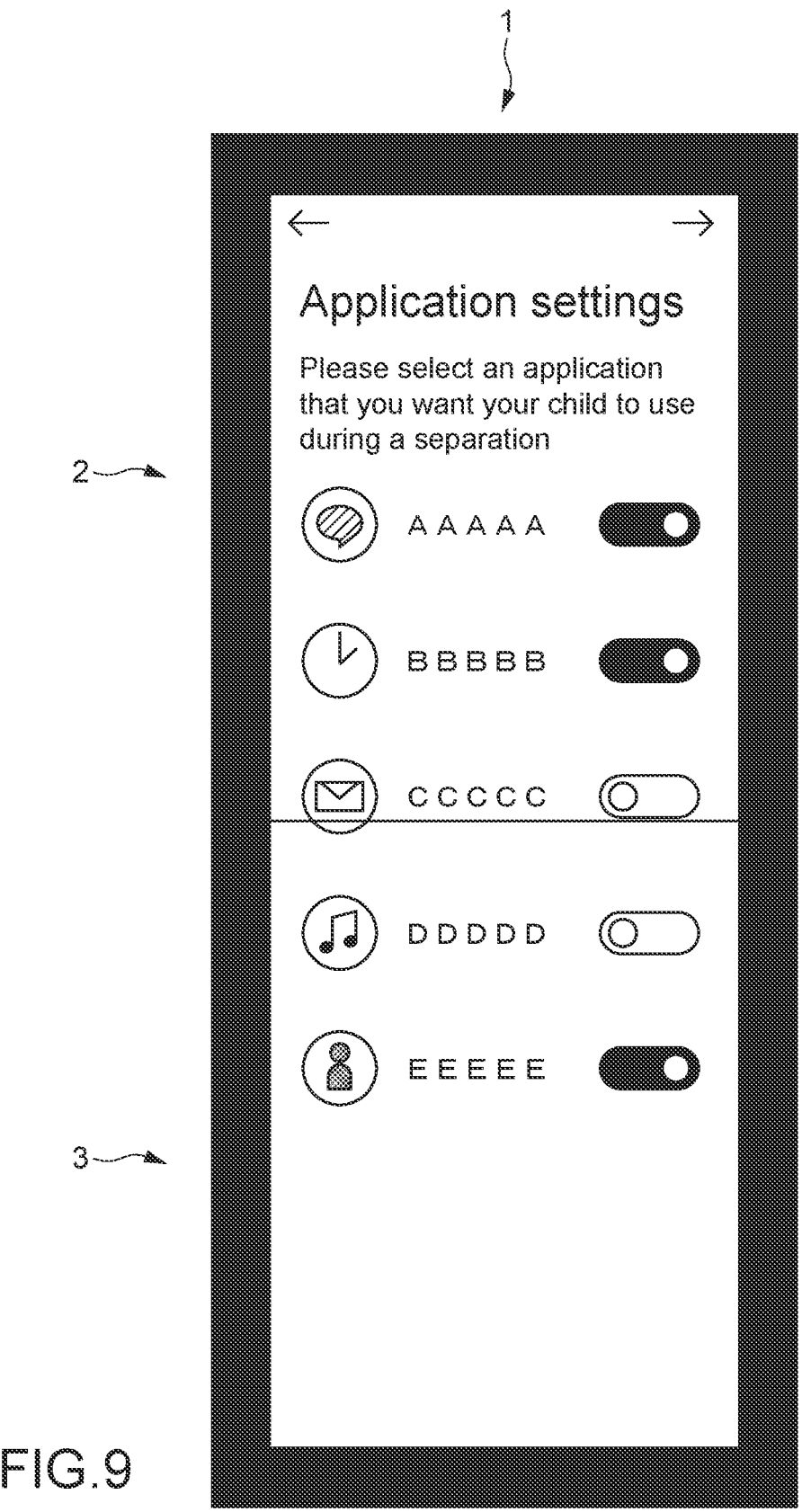
FIG. 9 is a diagram showing an example of a setting screen by the setting application.
Figure 10:
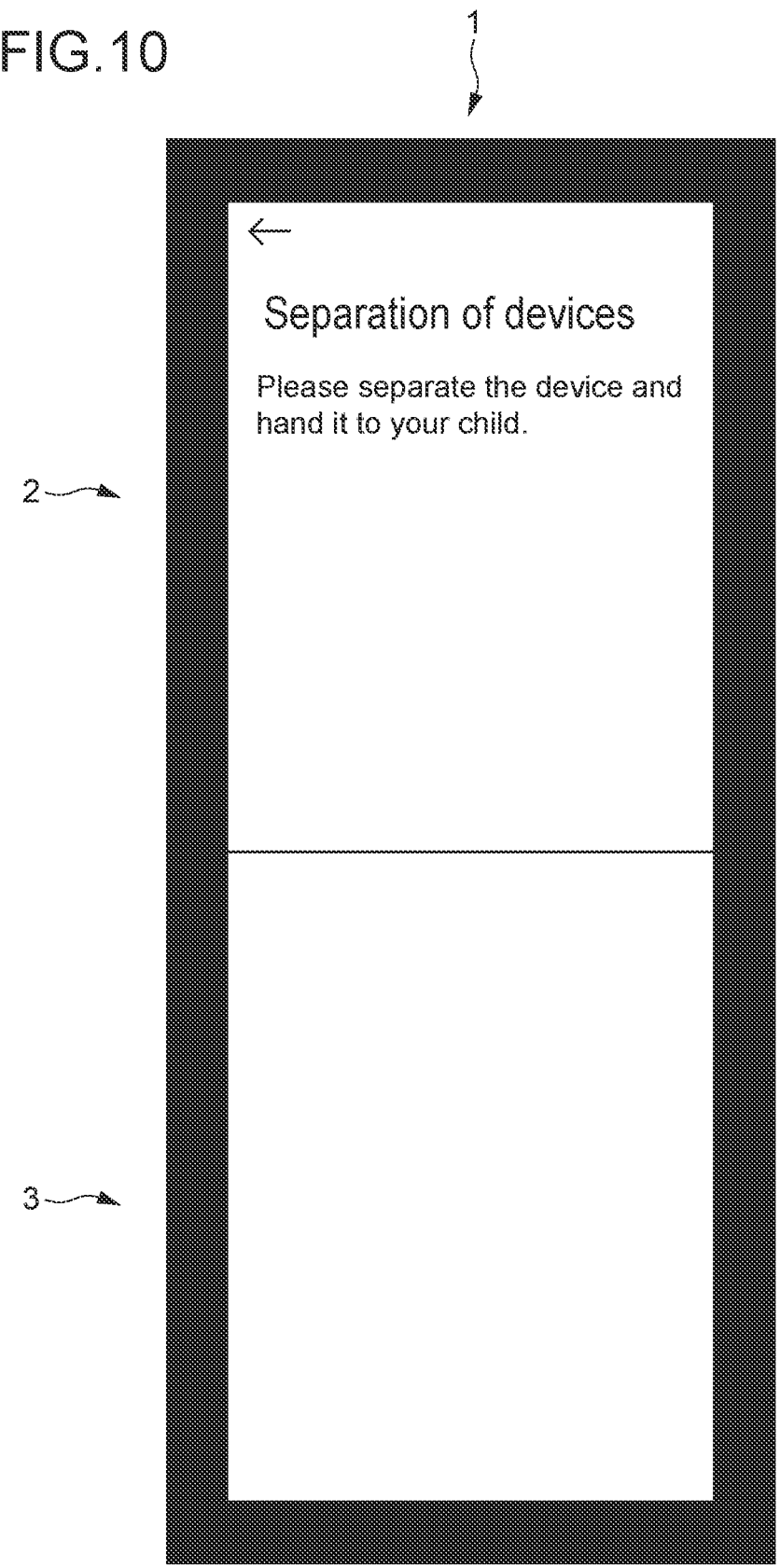
FIG. 10 is a diagram showing a massage prompting a separation.

FIGS. 8 to 10 are each a diagram showing an example of the content of display when setting an application that can be executed during a separation.

FIG. 8 is a diagram showing an example of an icon of a setting application.

FIG. 9 is a diagram showing an example of a setting screen by the setting application.

FIG. 10 is a diagram showing a massage prompting a separation.

As shown in FIG. 8, an icon 51 of a setting application is placed on a home screen or the like.

When the icon 51 is pressed, the setting screen as shown in FIG. 9 is displayed.

With this setting screen, for example, the parent can select an application that he/she wants his/her child to use.

When selection of an application is completed, for example, a massage prompting a separation of a parent device and a child device is displayed as shown in FIG. 10. In this way, the parent is notified of that he/she needs to separate the child device and hands it to his/her child.

When the parent separates the child device, for example, the application selected in FIG. 9 is automatically started in the child device immediately after the separation, and the child can use the application.

For example, settings are made such that only a specific game application can be executed during a separation. This makes it possible to prevent children from using an inappropriate application.

Note that the operation possible during a separation is not limited to execution of an application and an arbitrary operation may be selectable.

[Change in Generation Cycle During Connection]

During a connection between the first display device 2 and the second display device 3, the first display device 2 may operate such that the generation cycle of information regarding a first contact position is longer than that during a separation.

Specifically, in the case where it is determined by the determination unit 17 that a connection with the second display device 3 has not been made, information regarding a first contact position is generated at a first period. In the case where it is determined by the determination unit 17 that a connection with the second display device 3 has been made, information regarding a first contact position is generated at a second period longer than the first period.

For example, during a connection, information regarding a first contact position is generated once every 0.01 seconds as the first period.

Further, during a separation, information regarding a first contact position is generated once every 0.02 seconds as the second period. That is, information regarding a first contact position is generated at a period longer than the first period.

In other words, it can be also said that during a separation, information regarding a first contact position is generated at FPS (Frames Per Second) lower than those during a connection.

In the first display device 2, it is desirable that generation of information regarding a first contact position, transmission of information regarding a first contact position, and the like are executed within the same processing frame.

For example, it is desirable that processing of transmitting generated information regarding a first contact position and generating next information regarding a first contact position after the transmission, such as generation of information regarding a first contact position A, transmission of the information regarding a first contact position A, generation of information regarding a first contact position B, transmission of the information regarding a first contact position B, . . . , is executed in order.

However, in the case where the generation cycle of information regarding a first contact position is short, the information regarding a first contact position B can happen to be generated before the information regarding a first contact position A is transmitted.

Such a thing is desirably suppressed as much as possible because it causes a synchronization shift between the first display device 2 and the second display device 3.

In this embodiment, since information regarding a first contact position is generated in a long cycle during a connection, generation and transmission of information regarding a first contact position are performed in order. Therefore, it is possible to prevent a synchronization shift.

Note that the values of the first period and the second period used in the description are merely examples, and arbitrary values may be set in accordance with, for example, the performance of the device.

Further, similar processing may be executed for generation of first state information.

[Processing of Contact Near Boundary]

In the case where a contact near the boundary between the touch panel 4 and the touch panel 7 has been made, the contact may be processed as "one contact".

Specifically, in the case where it is determined by the determination unit 17 that a connection with the second display device 3 has been made and a contact with the boundary between the touch panel 4 and the touch panel 7 has been made, the communication unit 14 does not transmit information regarding a first contact position to the second display device 3.

The contact near the boundary between the touch panel 4 and the touch panel 7 is a contact with both the touch panel 4 and the touch panel 7 (a first contact and a second contact) where the user's finger or the like spreads on the touch panel 4 and the touch panel 7 across the boundary.

That is, the contact is processed by both the first display device 2 and the second display device 3. For this reason, it is unnecessary to mutually transmit and receive information regarding a first contact position and information regarding a second contact position.

Therefore, in this case, the communication unit 14 executes exceptional processing of transmitting no information regarding a first contact position.

As a result, the amount of information to be transmitted/received by the communication unit 14 is reduced, and the processing load on the CPU and the like is reduced.

[Connection Using Terminals]

In this embodiment, as shown in FIG. 3, the first display device 2 includes the connector (terminal) 25, and the second display device 3 includes the connector 40. A connection between the first display device 2 and the second display device 3 may be realized by the connectors 25 and 40.

Figure 11:
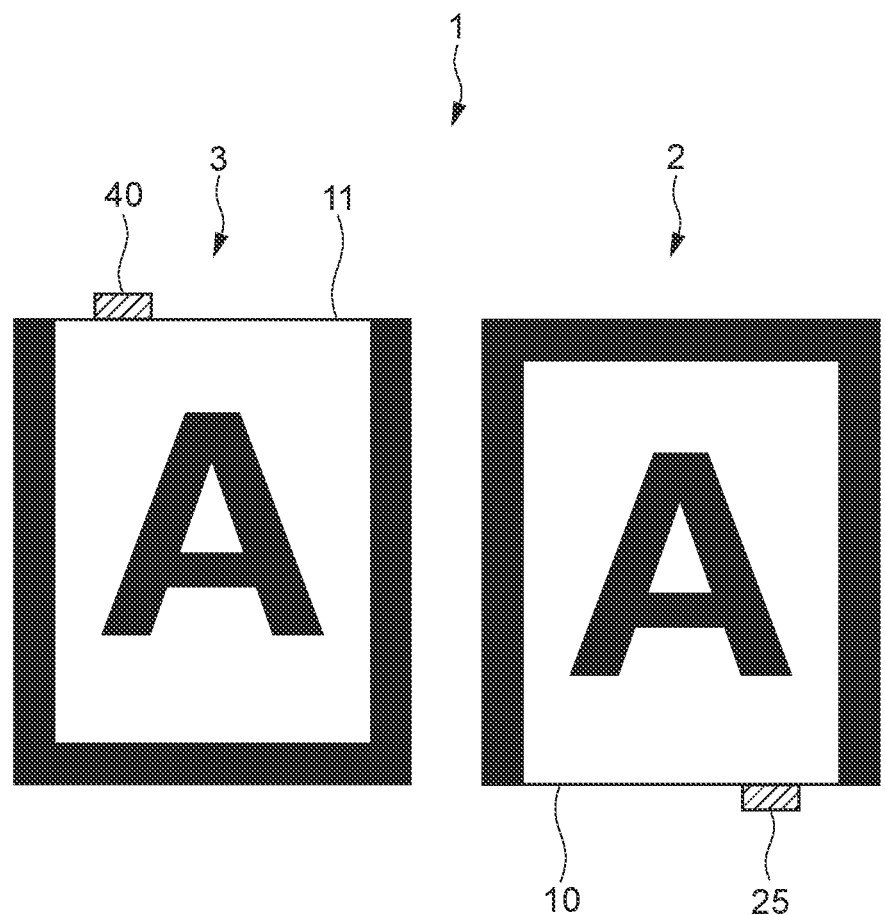
FIG. 11 is a schematic diagram of a display system for describing a connector.

FIG. 11 is a schematic diagram of the display system 1 for describing the connectors 25 and 40.

Note that in FIG. 11, illustration of the proximity sensors 5 and 8 is omitted.

In this embodiment, as shown in FIG. 11, the connector 25 is disposed on the first connection side 10.

Further, the connector 40 is disposed on the second connection side 11.

For example, the connector 25 is fitted into an insertion port (not shown) formed on the second connection side 11 of the second display device 3. Further, the connector 40 is fitted into an insertion port formed on the first connection side 10 of the first display device 2.

Figure 12:
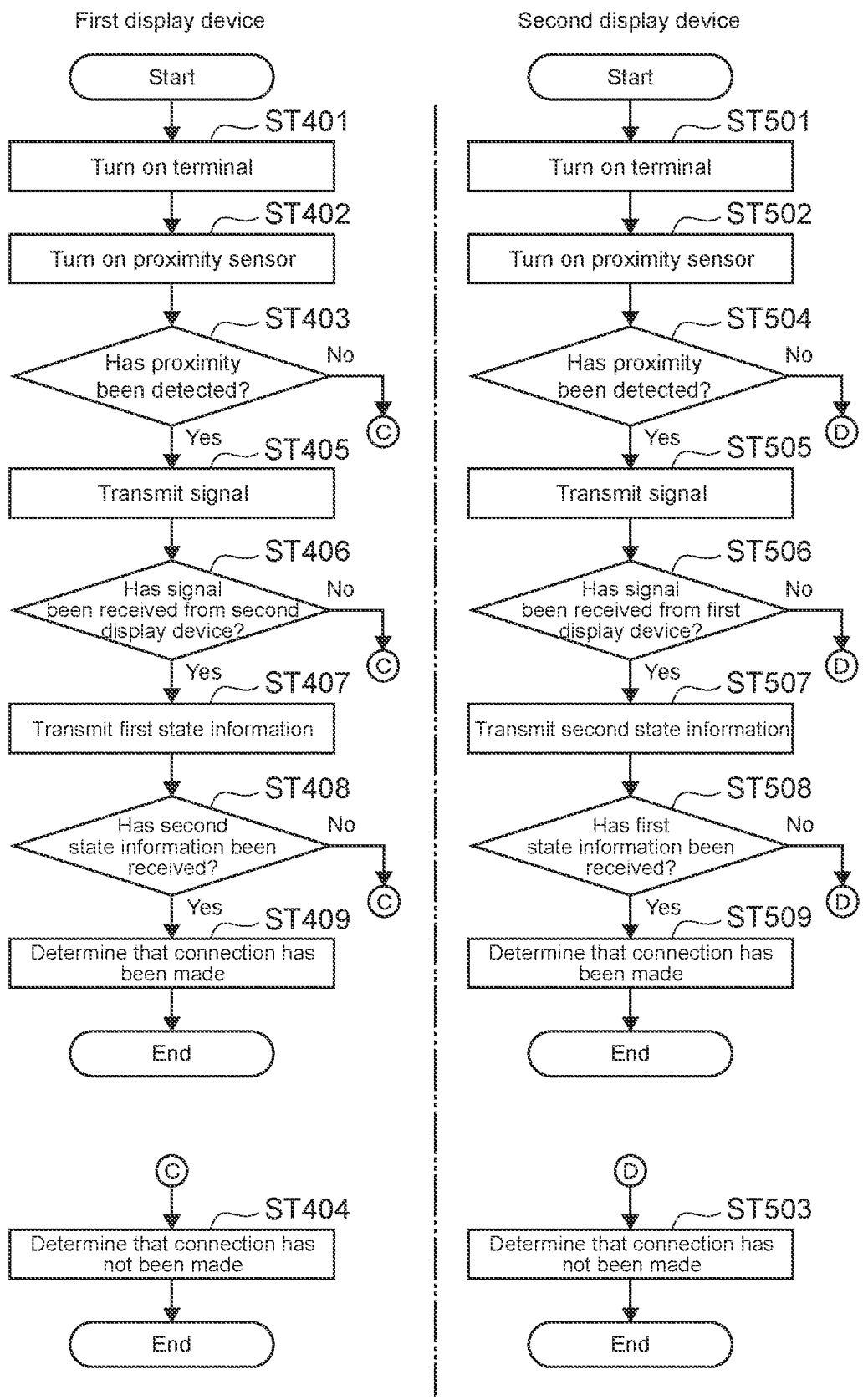
FIG. 12 is a flowchart showing an example of processing of determining a connection.

FIG. 12 is a flowchart showing an example of processing of determining a connection.

FIG. 12 shows an example of the processing of determining a connection in the case where the connection is realized by the connectors 25 and 40.

An operation of the connector 25 of the first display device 2 is started (Step 401).

Note that, for example, in the case where the processing shown in FIG. 12 has been executed in the past and the connector 25 is already operating, the processing of Step 401 may be omitted.

Since the processing of Step 402 and subsequent Steps is similar to the processing of Step 101 and subsequent Steps shown in FIG. 4, description thereof is omitted.

Even in the case where a connection is realized by, for example, the connectors 25 and 40 as described above, a connection is determined by processing similar to the processing shown in FIG. 4.

It goes without saying that the determination unit 17 may determine a connection in the case where each of the connectors 25 and 40 is fitted into the insertion port.

In this case, the connectors 25 and 40 function as an embodiment of a proximity detection unit according to the present technology. For example, the connector 25 detects the proximity of the second display device 3 in the case where the connector 25 is fitted into the insertion port, and it is determined by the determination unit 17 that a connection with the second display device 3 has been made.

A connection using the connectors 25 and 40 makes it possible to stably connect the first display device 2 and the second display device 3 to each other. For example, it is possible to prevent the first display device 2 and the second display device 3 from being unintentionally separated from each other.

As described above, in the display system 1 according to this embodiment, in the case where it is determined that a connection with the second display device 3 has been made in the first display device 2, a first virtual display region corresponding to the touch panel 4 of the first display device 2 and a second virtual display region corresponding to the touch panel 7 of the second display device 3 are set. In the case where a contact with the touch panel 4 has been made, information regarding a first contact position is transmitted to the second display device 3. In the case where a contact with the touch panel 7 has been made, information regarding a second contact position is received from the second display device 3.

Further, in the case where it is determined that a connection with the first display device 2 has been made in the second display device 3, a third virtual display region corresponding to the touch panel 7 of the second display device 3 and a fourth virtual display region corresponding to the touch panel 4 of the first display device 2 are set. In the case where a contact with the touch panel 7 has been made, information regarding a second contact position is transmitted to the first display device 2. In the case where a contact with the touch panel 4 has been made, information regarding a first contact position is received from the first display device 2.

As a result, it is possible to improve user convenience.

For example, in the case where the second virtual display region 44 is not set in the first display device 2, even if a contact with the touch panel 7 has been made, the position of the contact cannot be managed as coordinates because the first display device 2 does not have information regarding coordinates corresponding to the contact.

By setting the second virtual display region 44, it is possible to manage the position of a contact on the touch panel 7, which the first display device 2 does not actually have, as coordinates. Therefore, it is possible to perform an operation of the first display device 2 based on the contact on the touch panel 7.

Further, between the first display device 2 and the second display device 3, only information with a small amount of information such as information regarding a first contact position and first state information is transmitted/received.

Therefore, for example, video data having a large amount of information is not exchanged.

As a result, the amount of information to be transmitted by the communication unit 14 and the amount of information to be received are reduced, and it is possible to reduce the processing load on the CPU and the like.

Figure 13:
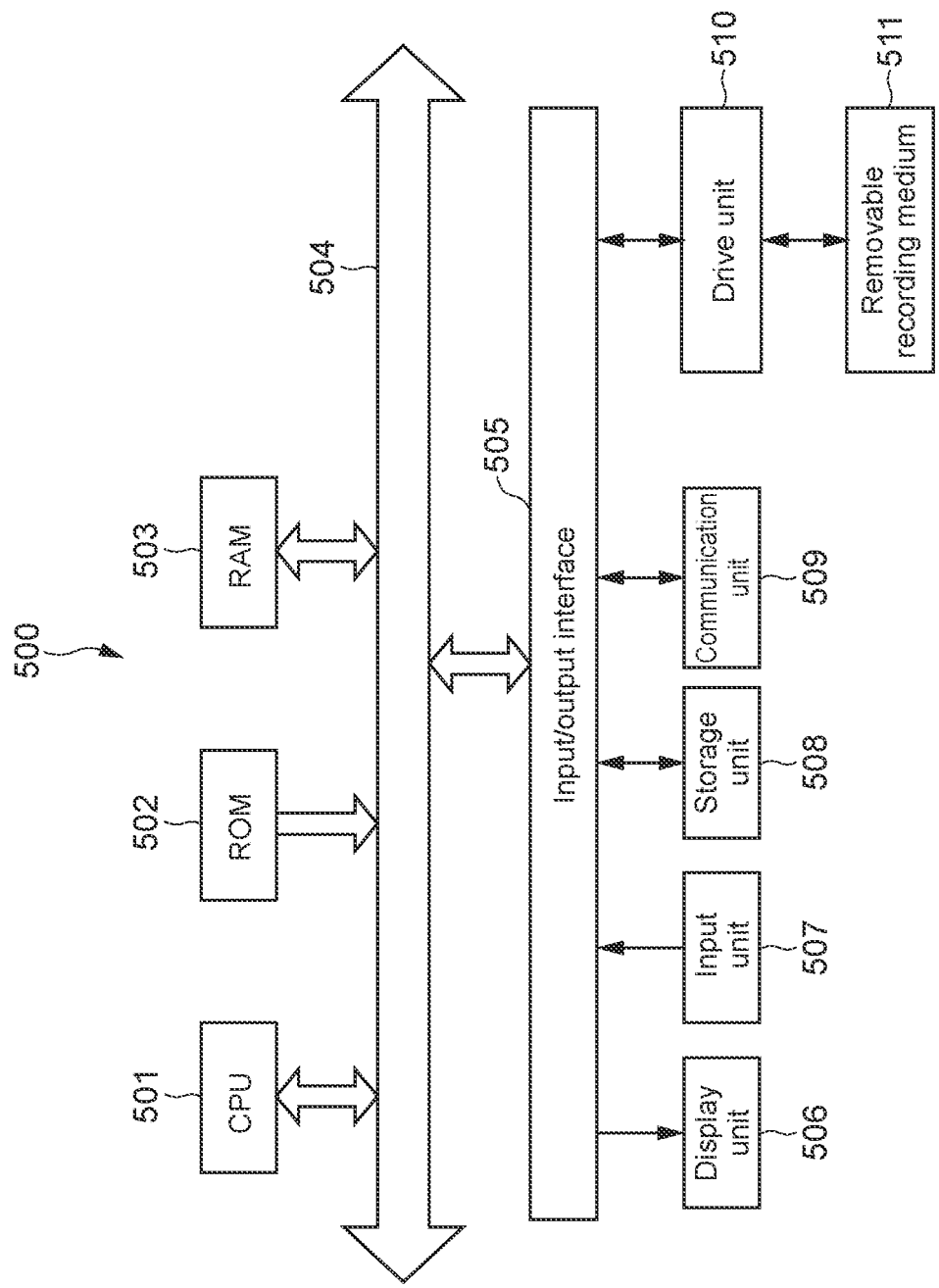
FIG. 13 is a block diagram showing a hardware configuration example of a computer capable of realizing the first display device and the second display device.

FIG. 13 is a block diagram showing a hardware configuration example of a computer 500 capable of realizing the first display device 2 and the second display device 3.

The computer 500 includes a CPU 501, a ROM 502, a RAM 503, an input/output interface 505, and a bus 504 that connects these to each other. A display unit 506, an input unit 507, a storage unit 508, a communication unit 509, a drive unit 510, and the like are connected to the input/output interface 505.

The display unit 506 is, for example, a display device using liquid crystal, EL, or the like. The input unit 507 is, for example, a keyboard, a pointing device, a touch panel, or another operating device. In the case where the input unit 507 includes a touch panel, the touch panel can be integrated with the display unit 506.

The storage unit 508 is a non-volatile storage device, and is, for example, an HDD, a flash memory, or another solid-state memory. The drive unit 98 is, for example, a device capable of driving a removable recording medium 511 such as an optical recording medium and a magnetic recording tape.

The communication unit 509 is a modem, a router, or another communication device for communicating with another device, which can be connected to LAN, WAN, or the like. The communication unit 509 may perform communication by wired or wireless communication. The communication unit 509 is often used separately from the computer 500.

The information processing by the computer 500 having the hardware configuration as described above is realized by cooperation between software stored in the storage unit 508, the ROM 502, or the like and hardware resources of the computer 500. Specifically, the information processing method according to the present technology is realized by loading a program constituting software, which is stored in the ROM 502 or the like, into the RAM 503 and executes the program.

The program is installed on the computer 500 via, for example, the removable recording medium 511. Alternatively, the program may be installed on the computer 500 via a global network or the like. In addition, an arbitrary non-transitory storage medium that can be read by the computer 500 may be used.

The display method according to the present technology may be executed and the display system and display device according to the present technology may be constructed by cooperation of a plurality of computers communicably connected to each other via a network or the like.

That is, the display method according to the present technology can be executed not only in a computer system including a single computer but also in a computer system in which a plurality of computers operates in conjunction.

Note that, in the present disclosure, the system means an aggregate of a plurality of components (such as apparatuses and modules (parts)) and it does not matter whether or not all the components are housed in the same casing. Thus, both a plurality of apparatuses housed in separate casings and connected to each other through a network, and a single apparatus in which a plurality of modules is housed in a single casing correspond to the system.

The execution of the display method according to the present technology by the computer system includes a case where determination of a connection, setting of a virtual display region, transmission and reception of information regarding a contact position, and the like are executed by a single computer and a case where each of the processes is executed by different computers. Further, the execution of the respective processes by a predetermined computer includes causing another computer to execute some or all of those processes and acquiring results thereof.

That is, the display method according to the present technology is also applicable to a cloud computing configuration in which one function is shared and jointly processed by a plurality of apparatuses via a network.

The configuration of the display system, each processing flow, and the like described with reference to the drawings are merely an embodiment and can be arbitrarily modified without departing from the essence of the present technology. That is, another arbitrary configuration, algorithm, and the like for implementing the present technology may be adopted.

In the present disclosure, in the case where the word "substantially" is used, it is used only to facilitate the understanding of description, and the use/non-use of the word "substantially" has no special meaning.

That is, in the present disclosure, concepts defining a shape, a size, a positional relationship, a state, and the like, such as "central", "middle", "uniform", "equal", "the same", "orthogonal", "parallel", "symmetrical", "extended", "axial direction", "columnar shape", "cylindrical shape", "ring shape", "annular shape", and "rectangular shape", are concepts including "substantially central", "substantially middle", "substantially uniform", "substantially equal", "substantially the same", "substantially orthogonal", "substantially parallel", "substantially symmetrical", "substantially extended", "substantially axial direction", "substantially columnar shape", "substantially cylindrical shape", "substantially ring shape", "substantially annular shape", "substantially rectangular shape", and the like.

For example, a state included in a predetermined range (e.g., a range of ±10%) based on "completely central", "completely middle", "completely uniform", "completely equal", "completely the same", "completely orthogonal", "completely parallel", "completely symmetrical", "completely extended", "completely axial direction", "completely columnar shape", "completely cylindrical shape", "completely ring shape", "completely annular shape", "completely rectangular shape" and the like is also included.

Therefore, even in the case where the word "substantially" is not added, a concept expressed by adding a so-called "substantially" can be included. On the contrary, the complete state is not excluded from the state expressed by adding "substantially".

In the present disclosure, expressions using "than" such as "larger than A" and "smaller than A" are expressions comprehensively including both the concept including the case where it is equivalent to A and the concept not including the case where it is equivalent to A. For example, the phrase "larger than A" is not limited to the case not including being equivalent to A and includes "A or more". Further, the phrase "smaller than A" is not limited to "less than A" and includes "A or less".

When implementing the present technology, specific settings and the like only need to be appropriately adopted from the concepts included in "larger than A" and "smaller than A" such that the effects described above are exhibited.

Of the feature portions according to the present technology described above, at least two feature portions can be combined. That is, the various characteristic portions described in the respective embodiments may be arbitrarily combined with each other without distinguishing from each other in the respective embodiments. Further, the effects described above are merely illustrative and are not limitative, and another effect may be exhibited.

It should be noted that the present technology may also take the following configurations.

(1) A display device, including:
   a first display unit that is capable of displaying an image;
   a determination unit that determines a connection with a different display device that includes a second display unit that is capable of displaying an image;
   a virtual display region setting unit that sets, in a case where it is determined that a connection with the different display device has been made, a second virtual display region with which each position of the second display unit is associated, in association with a first virtual display region with which each position of the first display unit is associated;
   a transmission unit that transmits information regarding a first contact position generated in accordance with a first contact on the first display unit to the different display device determined to be connected; and
   a reception unit that receives information regarding a second contact position generated in accordance with a second contact on the second display unit from the different display device determined to be connected.

(2) The display device according to (1), further including
   an execution unit that executes processing corresponding to the first contact on a basis of a position on the first virtual display region corresponding to the first contact position, and executes processing corresponding to the second contact on a basis of a position on the second virtual display region corresponding to the received information regarding the second contact position.

(3) The display device according to (1) or (2), in which
   the first display unit executes, in a case where it is determined that a connection with the different display device has been made, a cooperation display mode for displaying the image in cooperation with the second display unit.

(4) The display device according to any one of (1) to (3), further including
   a proximity detection unit that detects proximity of an object,
   the determination unit determining a connection with the different display device on a basis of proximity of the different display device.

(5) The display device according to (4), in which
   the determination unit determines whether or not the object whose proximity has been detected by the proximity detection unit is the different display device, and determines a connection with the different display device on a basis of a result of the determination.

(6) The display device according to (3), in which
   the transmission unit transmits first state information that is state information relating to the cooperation display mode of the display device to the different display device determined to be connected, and
   the reception unit receives second state information that is state information relating to the cooperation display mode of the different display device from the different display device determined to be connected.

(7) The display device according to (6), in which
   the determination unit determines, in a case where each of transmission of the first state information and reception of the second state information has been completed, that a connection with the different display device has been made.

(8) The display device according to (6) or (7), further including
   a state setting unit that sets a state of the display device relating to the cooperation display mode such that the first state information and the second state information received by the reception unit match.

(9) The display device according to (8), in which
   the state setting unit sets one of the display device and the different display device determined to be connected as a parent device and the other as a child device.

(10) The display device according to (9), in which
   the state setting unit sets, in a case where the display device is set as a child device, the state of the display device relating to the cooperation display mode such that the first state information matches the second state information received from the different display device set as a parent device.

(11) The display device according to any one of (8) to (10), in which
   the state setting unit sets the state of the display device relating to the cooperation display mode to an initial state.

(12) The display device according to any one of (8) to (11), in which
   the determination unit determines, in a case where it is determined that a connection with the different display device has been made, a difference between the first state information and the second state information received by the reception unit, and
   the state setting unit sets, in a case where it is determined by the determination unit that there is the difference, the state of the display device relating to the cooperation display mode such that the first state information and the second state information received by the reception unit match.

(13) The display device according to (12), in which
   the determination unit determines the difference between the first state information and the second state information received by the reception unit, at a predetermined period.

(14) The display device according to (12) or (13), in which
   the determination unit determines the difference between the first state information and the second state information received by the reception unit, in accordance with a user's instruction.
(15) The display device according to any one of (1) to (14), in which
the transmission unit transmits, in a case where it is determined that a connection with the different display device has been made and a boundary between the first display unit and the second display unit has been touched, no information regarding the first contact position to the different display device.
(16) The display device according to any one of (1) to (15), in which
information regarding the first contact position is generated at a first period in a case where it is determined by the determination unit that a connection with the different display device has not been made, and information regarding the first contact position is generated at a second period longer than the first period in a case where it is determined that a connection with the different display device has been made.
(17) The display device according to any one of (8) to (14), in which
the state setting unit sets, in a case where it is determined by the determination unit that a disconnection with the different display device has been newly made, the state of the display device relating to the cooperation display mode such that the first state information and the first state information immediately before being connected to the different display device match.
(18) A display system, including:
a first display device; and
a second display device,
the first display device including
a first display unit that is capable of displaying an image, and
a first determination unit that determines a connection with the second display device,
the second display device including
a second display unit that is capable of displaying an image, and
a second determination unit that determines a connection with the first display device,
the first display device further including
a first virtual display region setting unit that sets, in a case where it is determined by the first determination unit that a connection with the second display device has been made, a second virtual display region with which each position of the second display unit is associated, in association with a first virtual display region with which each position of the first display unit is associated,
a first transmission unit that transmits information regarding a first contact position generated in accordance with a first contact on the first display unit to the second display device determined to be connected by the first determination unit, and
a first reception unit that receives information regarding a second contact position generated in accordance with a second contact on the second display unit from the second display device determined to be connected by the first determination unit,
the second display device further including
a second virtual display region setting unit that sets, in a case where it is determined by the second determination unit that a connection with the first display device has been made, a fourth virtual display region with which each position of the first display unit is associated, in association with a third virtual display region with which each position of the second display unit is associated,
a second transmission unit that transmits information regarding the second contact position to the first display device determined to be connected by the second determination unit, and
a second reception unit that receives information regarding the first contact position from the first display device determined to be connected by the second determination unit.
(19) A display method, including:
by a display device that includes a first display unit that is capable of displaying an image,
determining a connection with a different display device that includes a second display unit that is capable of displaying an image;
setting, in a case where a connection with the different display device has been made, a second virtual display region with which each position of the second display unit is associated, in association with a first virtual display region with which each position of the first display unit is associated;
transmitting information regarding a first contact position generated in accordance with a first contact on the first display unit to the different display device determined to be connected; and
receiving information regarding a second contact position generated in accordance with a second contact on the second display unit from the different display device determined to be connected.
(20) A display method, including:
by a first display device that includes a first display unit that is capable of displaying an image,
determining a connection with a second display device that includes a second display unit that is capable of displaying an image;
setting, in a case where a connection with the second display device has been made, a second virtual display region with which each position of the second display unit is associated, in association with a first virtual display region with which each position of the first display unit is associated;
transmitting information regarding a first contact position generated in accordance with a first contact on the first display unit to the second display device determined to be connected; and
receiving information regarding a second contact position generated in accordance with a second contact on the second display unit from the second display device determined to be connected; and
by the second display device,
determining a connection with the first display device;
setting, in a case where a connection with the first display device has been made, a fourth virtual display region with which each position of the first display unit is associated, in association with a third virtual display region with which each position of the second display unit is associated;
transmitting information regarding the second contact position to the first display device determined to be connected; and receiving information regarding the first contact position from the first display device determined to be connected.

REFERENCE SIGNS LIST 1 display system
2 first display device
3 second display device
4 display
5 proximity sensor
7 display
8 proximity sensor
14 communication unit
15 controller
16 display control unit
17 determination unit
18 virtual display region setting unit
19 communication control unit
20 execution unit
21 state setting unit
29 communication unit
30 controller
31 display control unit
32 determination unit
33 virtual display region setting unit
34 communication control unit
35 execution unit
36 state setting unit
43 first virtual display region
44 second virtual display region
45 contact position
46 third virtual display region
47 fourth virtual display region
48 position

The invention claimed is:

1. A first display device, comprising:
a first display unit configured to display an image;
a determination unit configured to determine the first display device is one of connected or not connected with a second display device,
wherein the second display device includes a second display unit that displays the image;
a virtual display region setting unit configured to:
set a first virtual display region associated with a first plurality of positions on the first display unit; and
set, based on the determination that the first display device is connected with the second display device, a second virtual display region in association with the first virtual display region,
wherein the second virtual display region is associated with a second plurality of positions on the second display unit;
an execution unit configured to:
generate first information at a first period based on the determination that the first display device is not connected with the second display device,
wherein the first information indicates a first contact position of a first contact on the first display unit; and
generate the first information at a second period longer than the first period based on the determination that the first display device is connected with the second display device;
a transmission unit configured to transmit, after the second virtual display region is set, the first information to the second display device based on the determination that the first display device is connected with the second display device; and
a reception unit configured to receive second information from the second display device based on the determination that the first display device is connected with the second display device,
wherein the second information indicates a second contact position of a second contact on the second display unit.

2. The first display device according to claim 1, wherein the execution unit is further configured to:
execute a first process corresponding to the first contact,
wherein the execution of the first process is based on a first position on the first virtual display region corresponding to the first contact position; and
execute a second process corresponding to the second contact,
wherein the execution of the second process is based on a second position on the second virtual display region corresponding to the second contact position.

3. The first display device according to claim 1, wherein the first display unit is further configured to execute, based on the determination that the first display device is connected with the second display device, a cooperation display mode to display the image in cooperation with the second display unit.

4. The first display device according to claim 1, further comprising a proximity detection unit configured to detect a proximity of an object to the first display device,
wherein the determination unit is further configured to determine, based on the detected proximity of the object, the first display device is one of connected or not connected with the second display device.

5. The first display device according to claim 4, wherein the determination unit is further configured to:
determine, based on the detected proximity of the object, the object is the second display device; and
determine, based on the determination that the object is the second display device, the first display device is connected with the second display device.

6. The first display device according to claim 3, wherein the transmission unit is further configured to transmit first state information of the first display device to the second display device; and
the reception unit is further configured to receive second state information of the second display device from the second display device.

7. The first display device according to claim 6, wherein the determination unit is further configured to determine, based on completion of each of the transmission of the first state information and the reception of the second state information, the first display device is connected with the second display device.

8. The first display device according to claim 6, further comprising a state setting unit configured to set a state of the first display device such that the first state information matches the second state information.

9. The first display device according to claim 8, wherein the state setting unit is further configured to set the first display device as a slave device and the second display device as a parent device.

10. The first display device according to claim 9, wherein the state setting unit is further configured to set the state of the first display device set as the slave device, such that the first state information matches the second state information.

11. The first display device according to claim 8, wherein the state setting unit is further configured to set the state of the first display device to an initial state.

12. The first display device according to claim 8, wherein the determination unit is further configured to determine, based on the determination that the first display device is connected with the second display device, a difference between the first state information and the second state information, and
the state setting unit is further configured to set, based on the determined difference, the state of the first display device such that the first state information matches the second state information.

13. The first display device according to claim 12, wherein the determination unit is further configured to determine the difference between the first state information and the second state information at a third period.

14. The first display device according to claim 12, wherein the determination unit is further configured to determine the difference between the first state information and the second state information based on a user instruction.

15. The first display device according to claim 1, wherein the transmission unit is further configured to restrict, based on the determination that the first display device is connected with the second display device and a touch operation on a boundary between the first display unit and the second display unit, the transmission of the first information indicating the first contact position to the second display device.

16. The first display device according to claim 8, further comprising a memory configured to store third state information of the first display device prior to the connection of the first display device with the second display device, wherein
the determination unit is further configured to determine the first display device is disconnected from the second display device, and
the state setting unit is further configured to set, based on the determination the first display device is disconnected from the second display device, the state of the first display device such that the first state information matches the third state information.

17. A display system, comprising:
a first display device; and
a second display device, wherein
the first display device includes:
a first display unit configured to display an image;
a first determination unit configured to determine the first display device is one of connected or not connected with the second display device,
wherein the second display device includes a second display unit configured to display the image;
a first virtual display region setting unit configured to:
set a first virtual display region associated with a first plurality of positions on the first display unit; and
set, based on the determination that the first display device is connected with the second display device, a second virtual display region in association with the first virtual display region, wherein the second virtual display region is associated with a second plurality of positions on the second display unit;
an execution unit configured to:
generate first information at a first period based on the determination that the first display device is not connected with the second display device, wherein the first information indicates a first contact position of a first contact on the first display unit; and
generate the first information at a second period longer than the first period based on the determination that the first display device is connected with the second display device;
a first transmission unit configured to transmit, after the second virtual display region is set, the first information to the second display device based on the determination that the first display device is connected with the second display device; and
a first reception unit configured to receive second information from the second display device based on the determination that the first display device is connected with the second display device,
wherein the second information indicates a second contact position of a second contact on the second display unit, and
the second display device further includes:
a second determination unit configured to determine the second display device is one of connected or not connected with the first display device;
a second virtual display region setting unit configured to:
set a third virtual display region associated with the second plurality of positions on the second display unit; and
set, based on the determination that the second display device is connected with the first display device, a fourth virtual display region in association with the third virtual display region, wherein the fourth virtual display region is associated with the first plurality of positions on the first display unit;
a second transmission unit configured to transmit, after the fourth virtual display region is set, the second information indicating the second contact position to the first display device; and
a second reception unit configured to receive the first information indicating the first contact position from the first display device.

18. A display method, comprising:
by a first display device that includes a first display unit,
determining the first display device is one of connected or not connected with a second display device,
wherein the second display device includes a second display unit;
setting a first virtual display region associated with a first plurality of positions on the first display unit;
setting, based on the determination that the first display device is connected with the second display device, a second virtual display region in association with the first virtual display region,
wherein the second virtual display region is associated with a second plurality of positions on the second first display unit;
generating first information at a first period based on the determination that the first display device is not connected with the second display device,
wherein the first information indicates a first contact position of a first contact on the first display unit;

generating the first information at a second period longer than the first period based on the determination that the first display device is connected with the second display device;

transmitting, after the second virtual display region is set, the first information to the second display device based on the determination that the first display device is connected with the second display device; and receiving second information from the second display device based on the determination that the first display device is connected with the second display device, wherein the second information indicates a second contact position of a second contact on the second display unit.

19. A display method, comprising:

by a first display device that includes a first display unit, determining the first display device is one of connected or not connected with a second display device, wherein the second display device includes a second display unit;

setting a first virtual display region associated with a first plurality of positions on the first display unit;

setting, based on the determination that the first display device is connected with the second display device, a second virtual display region in association with the first virtual display region, wherein the second virtual display region is associated with a second plurality of positions on the second display unit;

generating first information at a first period based on the determination that the first display device is not connected with the second display device, wherein the first information indicates a first contact position of a first contact on the first display unit;

generating the first information at a second period longer than the first period based on the determination that the first display device is connected with the second display device;

transmitting, after the second virtual display region is set, the first information to the second display device based on the determination that the first display device is connected with the second display device; and receiving second information from the second display device based on the determination that the first display device is connected with the second display device, wherein the second information indicates a second contact position of a second contact on the second display unit; and by the second display device, determining the second display device is one of connected or not connected with the first display device;

setting a third virtual display region associated with the second plurality of positions on the second display unit;

setting, based on the determination that the second display device is connected with the first display device, a fourth virtual display region in association with the third virtual display region, wherein the fourth virtual display region is associated with the first plurality of positions on the first display unit;

transmitting the second information indicating the second contact position to the first display device; and receiving the first information indicating the first contact position from the first display device.

\* \* \* \* \*